(12) United States Patent
Norikane et al.

(10) Patent No.: US 8,574,807 B2
(45) Date of Patent: Nov. 5, 2013

(54) METHOD OF MANUFACTURING TONER, TONER MANUFACTURING APPARATUS, AND METHOD OF MANUFACTURING RESIN PARTICLES

(75) Inventors: Yoshihiro Norikane, Kanagawa (JP); Masaru Ohgaki, Kanagawa (JP); Andrew Mwaniki Mulwa, Kanagawa (JP); Yuko Sekiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 100 days.

(21) Appl. No.: 13/251,606

(22) Filed: Oct. 3, 2011

(65) Prior Publication Data

US 2012/0094231 A1 Apr. 19, 2012

(30) Foreign Application Priority Data

Oct. 19, 2010 (JP) ................. 2010-234538
Jul. 27, 2011 (JP) ................. 2011-164558

(51) Int. Cl.
*G03G 9/08* (2006.01)

(52) U.S. Cl.
USPC ...................................... 430/137.1

(58) Field of Classification Search
USPC ...................................... 430/137.1
See application file for complete search history.

(56) References Cited

U.S. PATENT DOCUMENTS

| 8,012,663 B2 | 9/2011 | Norikane et al. |
| 2008/0227011 A1 | 9/2008 | Kuramoto et al. |
| 2008/0241727 A1 | 10/2008 | Norikane et al. |
| 2008/0248416 A1 | 10/2008 | Norikane et al. |
| 2008/0286679 A1 | 11/2008 | Norikane et al. |
| 2008/0286680 A1 | 11/2008 | Norikane et al. |
| 2009/0117486 A1 | 5/2009 | Watanabe et al. |
| 2009/0170018 A1 | 7/2009 | Kuramoto et al. |
| 2009/0239170 A1 | 9/2009 | Honda et al. |
| 2009/0317735 A1* | 12/2009 | Ohtani et al. ............. 430/105 |
| 2009/0317738 A1 | 12/2009 | Honda et al. |
| 2010/0003613 A1 | 1/2010 | Honda et al. |
| 2010/0021209 A1 | 1/2010 | Watanabe et al. |
| 2010/0055600 A1 | 3/2010 | Norikane et al. |
| 2010/0104970 A1 | 4/2010 | Norikane et al. |
| 2010/0227267 A1 | 9/2010 | Shitara et al. |
| 2010/0297548 A1 | 11/2010 | Honda et al. |
| 2010/0310982 A1 | 12/2010 | Ohtani et al. |
| 2011/0014565 A1 | 1/2011 | Norikane et al. |

FOREIGN PATENT DOCUMENTS

| CN | 101308339 A | 11/2008 | |
| JP | 2008-286947 | 11/2008 | |
| JP | 2008-292976 | 12/2008 | |
| JP | 2010-66457 | 3/2010 | |
| WO | 2008/114655 | * 9/2008 | ............. G03G 9/087 |

OTHER PUBLICATIONS

U.S. Appl. No. 13/235,016, filed Sep. 16, 2011, Makabe, et al.
U.S. Appl. No. 13/112,035, filed May 20, 2011, Yohichiroh, et al.

* cited by examiner

*Primary Examiner* — Hoa V Le
(74) *Attorney, Agent, or Firm* — Oblon, Spivak, McClelland, Maier & Neustadt, L.L.P.

(57) ABSTRACT

A method of manufacturing toner is provided, including discharging a toner constituents liquid from multiple nozzles to form liquid droplets and solidifying the liquid droplets into toner particles. The multiple nozzles satisfy the following formula:

$2.5 \leq p/d \leq 7.5$ wherein d represents an outlet diameter of each nozzle and p represents an interval between two nozzles.

16 Claims, 9 Drawing Sheets

— VELOCITY DISTRIBUTION
--- PRESSURE DISTRIBUTION

METHOD OF MANUFACTURING TONER, TONER MANUFACTURING APPARATUS, AND METHOD OF MANUFACTURING RESIN PARTICLES

CROSS-REFERENCE TO RELATED APPLICATIONS

This patent application is based on and claims priority pursuant to 35 U.S.C. §119 to Japanese Patent Application Nos. 2010-234538 and 2011-164558, filed on Oct. 19, 2010 and Jul. 27, 2011, respectively, in the Japanese Patent Office, the entire disclosure of each of which is hereby incorporated herein by reference.

FIELD OF THE INVENTION

The present invention relates to a method of manufacturing toner or resin particles, and a toner manufacturing apparatus.

BACKGROUND OF THE INVENTION

Uniformly-sized resin particles have been applied to various uses, such as electrophotographic toner particles, spacer particles for liquid crystal panels, colored particles for electric papers, and particles for supporting medical or pharmaceutical agents. Uniformly-sized resin particles are obtainable by, for example, soap-free polymerization that is induced in liquids. Soap-free polymerization desirably produces small-sized particles with a narrow size distribution and nearly spherical shape. However, because the soap-free polymerization is generally induced in water, it is inefficient to remove the water to collect the resultant resin particles. The soap-free polymerization requires a long time period until the reaction is terminated, and further requires another time period for separating the resultant particles from the liquid and washing and drying them repeatedly. Thus, the soap-free polymerization wastes large amounts of time, water, and energy.

Japanese Patent Application Publication No. 2008-286947 discloses a method of manufacturing toner. In this method, a toner constituents liquid is discharged from multiple nozzles formed on a thin film. The thin film is periodically and vertically vibrated by a vibration generator. In accordance with the periodical vibration of the thin film, the inner pressure of a liquid chamber to which the thin film is provided is also periodically varied and thus the toner constituents liquid is discharged from the liquid chamber to a gas phase to be formed into liquid droplets. Each liquid droplet thus discharged moves in the same direction in line within the gas phase. The liquid droplets are formed into spherical particles due to the difference in surface tension between the liquid droplets and the gas phase, and further dried into solid particles.

While the liquid droplets move in the same direction, an air current is generated around the liquid droplets because the gas phase that is viscous is given the speed of the moving liquid droplets. This air current is hereinafter referred to as accompanying air current. When the accompanying air current is generated around one line of the liquid droplets, the moving speed of the liquid droplets is gradually reduced by the action of the accompanying air current and viscosity of the gas phase. Because of having a different size, each liquid droplet in the line has a different moving speed. Therefore, the distance between the adjacent liquid droplets becomes smaller and smaller and the adjacent liquid droplets finally get coalesced. The coalesced liquid droplets accelerate coalescence of the subsequent liquid droplets because of having a greater fluid drag and a lower moving speed. This phenomenon in which liquid droplets get coalesced in the direction of movement is hereinafter referred to as vertical coalescence. In the gas phase, liquid droplets which have been vertically coalesced and those which have not been coalesced are coexisting. Therefore, the resulting particles have various sizes, which is not suitable for toner particles.

BRIEF SUMMARY OF THE INVENTION

Exemplary aspects of the present invention are put forward in view of the above-described circumstances, and provide a novel method of manufacturing a uniformly-sized toner and a novel apparatus that manufactures a uniformly-sized toner.

In one exemplary embodiment, a novel method includes discharging a toner constituents liquid from multiple nozzles to form liquid droplets and solidifying the liquid droplets into toner particles, while the multiple nozzles satisfying the following formula:

$$2.5 \leq p/d \leq 7.5$$

wherein d represents an outlet diameter of each nozzle and p represents an interval between two nozzles.

In another exemplary embodiment, a novel apparatus includes a liquid droplet discharge unit that discharges a toner constituents liquid from multiple nozzles to form liquid droplets and a solidifying unit that solidifies the liquid droplets, while the multiple nozzles satisfying the following formula:

$$2.5 \leq p/d \leq 7.5$$

wherein d represents an outlet diameter of each nozzle and p represents an interval between two nozzles.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
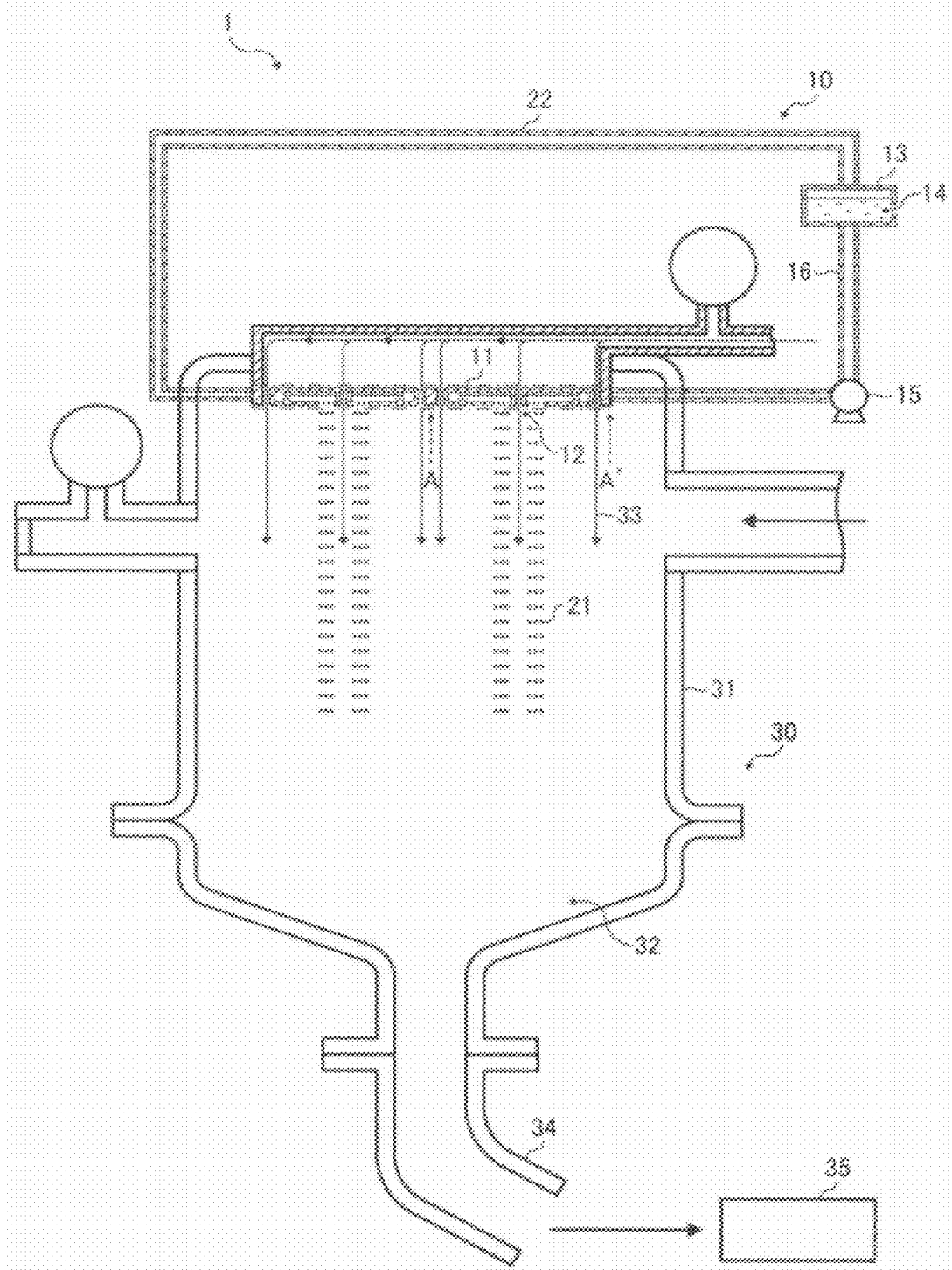
FIG. 1 is a schematic view illustrating a toner manufacturing apparatus according to exemplary embodiments of the invention.
Figure 2:
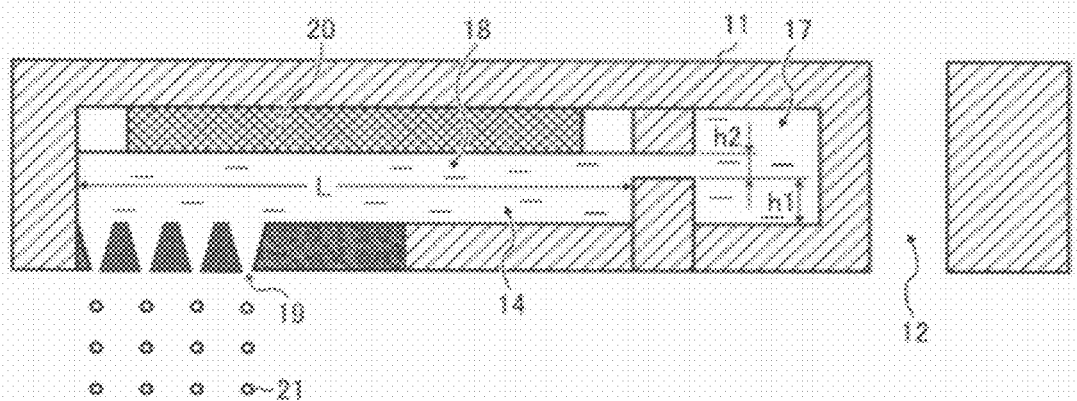
FIG. 2 is a cross-sectional view illustrating a liquid droplet discharge head in a liquid droplet forming unit illustrated in FIG. 1.
Figure 3:
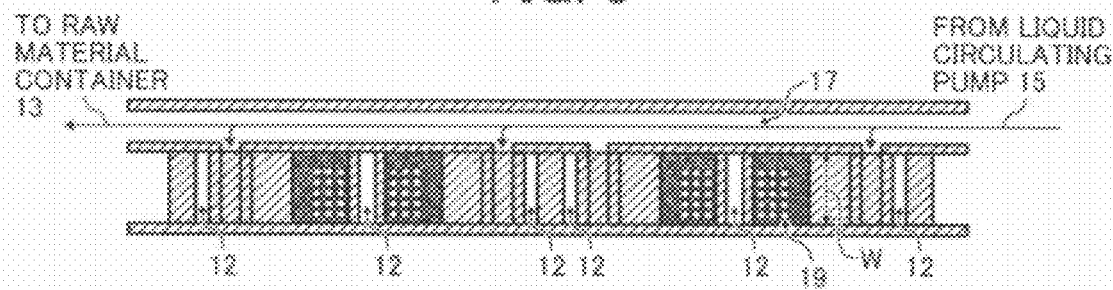
FIG. 3 is a cross-sectional view illustrating the liquid droplet forming unit viewed from the line A-A' in FIG. 1.

FIG. 1 is a schematic view illustrating a toner manufacturing apparatus according to exemplary embodiments of the invention. FIG. 2 is a cross-sectional view illustrating a liquid droplet discharge head in a liquid droplet forming unit illustrated in FIG. 1. FIG. 3 is a cross-sectional view illustrating the liquid droplet forming unit viewed from the line A-A' in FIG. 1. A toner manufacturing apparatus 1 illustrated in FIG. 1 has a liquid droplet forming unit 10 and a drying collecting unit 30. The liquid droplet forming unit 10 has a liquid chamber that is communicated with exterior through nozzles. The liquid droplet forming unit 10 has multiple liquid droplet discharge heads 11 that discharge a toner constituents liquid from a liquid column resonance liquid chamber, to be described in detail later, through the nozzles to form the toner constituents liquid into liquid droplets. On both sides of each liquid droplet discharge head 11, airflow pathways 12 through which an airflow generated from an airflow generator passes are provided so that the liquid droplets are guided to the drying collecting unit 30. The liquid droplet forming unit 10 also has a raw material container 13 that contains a toner constituents liquid 14, and a liquid circulating pump 15 that supplies the toner constituents liquid 14 from the raw material container 13 to a liquid common supply path 17 through a liquid supply pipe 16 and returns the toner constituents liquid 14 from the liquid supply pipe 16 to the raw material container 13 through a liquid return pipe 22. As illustrated in FIG. 2, the liquid droplet discharge head 11 has the liquid common supply path 17 and the liquid column resonance liquid chamber 18. The liquid column resonance liquid chamber 18 is communicated with the liquid common supply path 17 provided on its one longitudinal end wall surface. The liquid column resonance liquid chamber 18 also has nozzles 19 that discharge toner liquid droplets 21 and a vibration generator 20 that generates high-frequency vibration so that a standing wave occurs in liquid column resonance. The nozzles 19 are provided on one wall surface of the liquid column resonance liquid chamber 18 which is connected with both longitudinal end wall surfaces. The vibration generator 20 is connected to a high-frequency power source, not shown.

The drying collecting unit 30 has a chamber 31 and a toner collecting part 32. Within the chamber 31, an air current generated from an air current generator, not shown, and a descending air current 33 join together and form a large descending air current. The toner liquid droplets 21 discharged from the liquid droplet discharge heads 11 are conveyed downward not only by gravity but also by the descending air current 33. Thus, the toner liquid droplets 21 are prevented from decelerating by air resistance. Even when toner liquid droplets 21 are continuously discharged, they are prevented from decelerating by air resistance. Therefore, subsequent liquid droplets are prevented from catching up and coalescing with the preceding liquid droplets. The air current may be generated by either providing an air blower upstream from the chamber 31 to apply pressure to the chamber 31 or sucking the chamber 31 from the toner collecting part 32 to reduce pressure in the chamber 31. Within the toner collecting part 32, a rotating air current generator, not shown, is provided. The rotating air current generator generates a rotating air current rotatable around an axis parallel to the vertical direction. The chamber 31 is connected to a toner retention part 35 that retains dried and solidified toner particles collected through a toner collecting tube 34.

The toner manufacturing apparatus 1 may operate as follows. Referring to FIG. 1, the liquid circulating pump 15 supplies the toner constituents liquid 14 from the raw material container 13 to the liquid supply pipe 16. The toner constituents liquid 14 then flows into the liquid common supply path 17, as illustrated in FIG. 3, and is further supplied to the liquid column resonance liquid chamber 18 provided in the liquid droplet discharge head 11, as illustrated in FIG. 2. Within the liquid column resonance liquid chamber 18 filled with the toner constituents liquid 14, the vibration generator 20 causes liquid column resonance and a pressure standing wave therein, i.e., a pressure distribution is formed. The toner liquid droplets 21 are discharged from the nozzles 19 provided on an area including antinodes of the pressure standing wave generated in liquid column resonance. At the antinodes of the pressure standing wave, the amplitude in pressure variation is large enough to discharge the toner liquid droplets 21. Each antinode of the pressure standing wave (i.e., node of a velocity standing wave) is defined as a region extending from a position at a local maximum amplitude toward a position at a local minimum amplitude for a distance ±⅔ of the wavelength, preferably ±¼ of the wavelength. At the antinodes of the pressure standing wave, each of the multiple nozzles 19 uniformly discharges toner liquid droplets at a high efficiency without causing nozzle clogging. After passing the liquid common supply path 17, the toner constituents liquid 14 flows into the liquid return pipe 22 and returns to the raw material container 13. Because the amount of the toner constituents liquid 14 in the liquid column resonance liquid chamber 18 is reduced after the toner liquid droplets 21 have been discharged, suction force generated by the action of the standing waves occurred in liquid column resonance is reduced within the liquid column resonance liquid chamber 18. Thus, the liquid common supply path 17 temporarily increases the flow rate of the toner constituents liquid 14 to fill the liquid column resonance liquid chamber 18 with the toner constituents liquid 14. After the liquid column resonance liquid chamber 18 has been refilled with the toner constituents liquid 14, the flow rate of the toner constituents liquid 14 in the liquid common supply path 17 is returned. Thus, the toner constituents liquid 14 starts circulating through the liquid supply pipe 16 and the liquid return pipe 22 again. The toner liquid droplets 21 discharged from the liquid droplet discharge heads 11 are conveyed downward not only by gravity but also by the descending air current 33 formed from an air current generated from the air current generator, not shown, that passes through the airflow pathways 12, as illustrated in FIG. 1. A rotating air current generated from the rotating air current generator, not shown, and the descending air current 33 form a spiral air current along a conical inner wall surface of the toner collecting part 32. The spiral air current dries and solidifies the toner liquid droplets 21 into toner particles. The toner particles thus formed are retained in the toner retention part 35 through the toner collecting tube 34.

The liquid column resonance liquid chamber 18 is formed by jointing frames. The frames are formed from a material having a high stiffness which does not adversely affect liquid resonant frequency at drive frequency, such as a metal, ceramic, and silicon. Referring to FIG. 2, a length L between both longitudinal ends of the liquid column resonance liquid chamber 18 is determined based on a liquid column resonance principle to be described in detail later. Referring to FIG. 3, a width W of the liquid column resonance liquid chamber 18 is preferably smaller than half of the length L so as not to give excessive frequency to the liquid column resonance. To drastically improve manufacturability, the liquid droplet forming unit 10 preferably includes multiple liquid column resonance liquid chambers 18. The number of the liquid column resonance liquid chambers 18 in one liquid droplet forming unit 10 is preferably 100 to 2,000 from the viewpoint of operability and manufacturability. The liquid common supply path 17 is communicated with the multiple liquid column resonance liquid chambers 18 so that the toner constituents liquid 14 is supplied to each liquid column resonance liquid chamber 18.

The vibration generator 20 is driven at a predetermined frequency. Preferably, the vibration generator 20 is formed from a piezoelectric body and an elastic plate attached to each other. The elastic plate constitutes a part of the wall of the liquid column resonance liquid chamber 18 so that the piezoelectric body does not contact the liquid. The piezoelectric body may be, for example, a piezoelectric ceramic such as lead zirconate titanate (PZT). Because of having a small displacement, the piezoelectric body is generally laminated. Additionally, piezoelectric polymers such as polyvinylidene fluoride (PVDF), crystals, and single crystals of $LiNbO_3$, $LiTaO_3$, and $KNbO_3$ are also usable. Preferably, the vibration generator 20 in each liquid column resonance liquid chamber 18 is independently controllable. Alternatively, a single blockish vibrating material may be partially cut to fit the arrangement of the liquid column resonance liquid chambers 18. In this case, preferably, each liquid column resonance liquid chamber 18 is independently controllable through the elastic plate.

Each of the nozzles 19 preferably has an outlet diameter of 1 to 40 µm. When the outlet diameter is less than 1 µm, the resulting liquid droplets may be too small to be used as toner particles. Moreover, in a case in which the toner constituents liquid includes solid particles such as pigments, the nozzles 19 may be frequently clogged. When the outlet diameter is greater than 40 µm, the resulting liquid droplets may be relatively large. They are dried and solidified into toner particles having a particle diameter of 3 to 6 µm. In some of these cases, the toner constituents liquid needs to be diluted with an organic solvent and therefore a large amount of drying energy is required to obtain toner particles, which is undesirable. It is preferable to provide a large number of nozzles 19 in the width direction of the liquid column resonance liquid chamber 18, as illustrated in FIG. 3, to improve production efficiency. The liquid column resonant frequency depends on the arrangement of the nozzles 19. Thus, the liquid column resonant frequency is preferably determined based on discharge condition of liquid droplets.

Figure 4A:
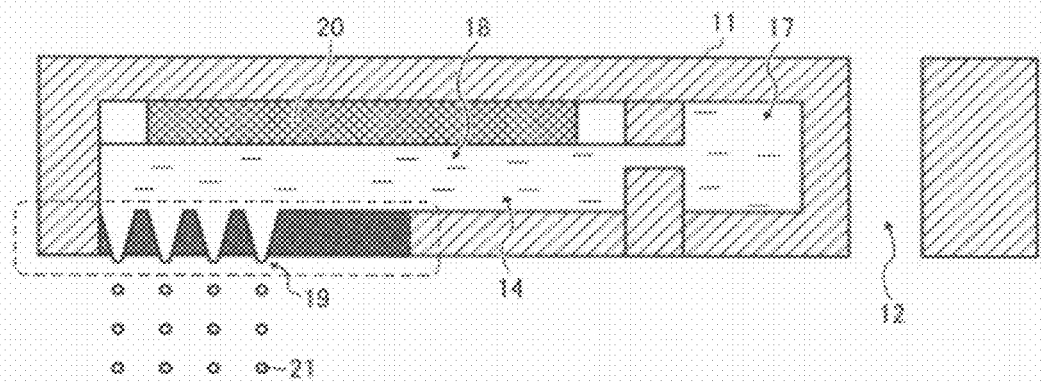
FIG. 4A is a schematic view illustrating the liquid droplet discharge head 11 and FIG. 4B is a magnified view of the area circled by a dotted line in FIG. 4A.
Figure 4B:
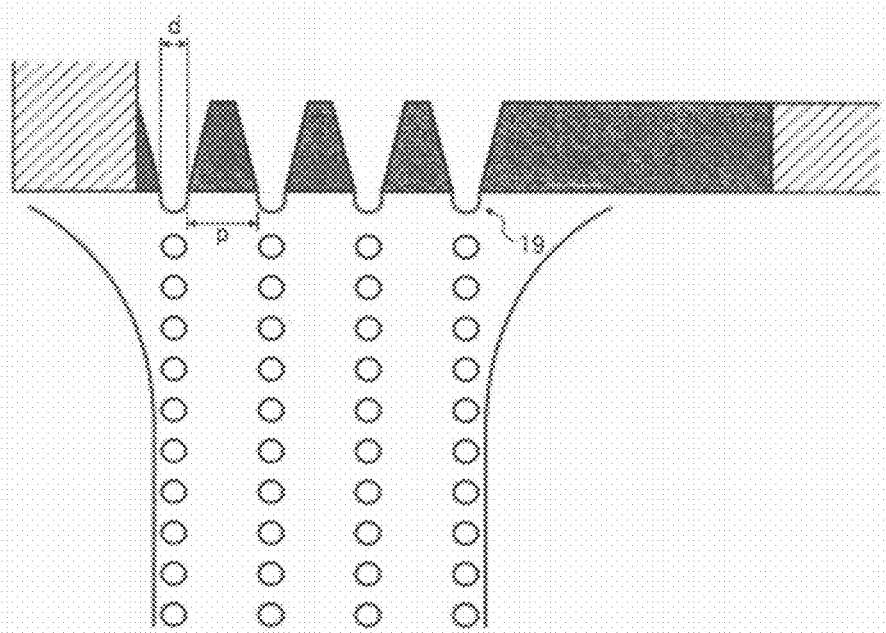
Figure 5:
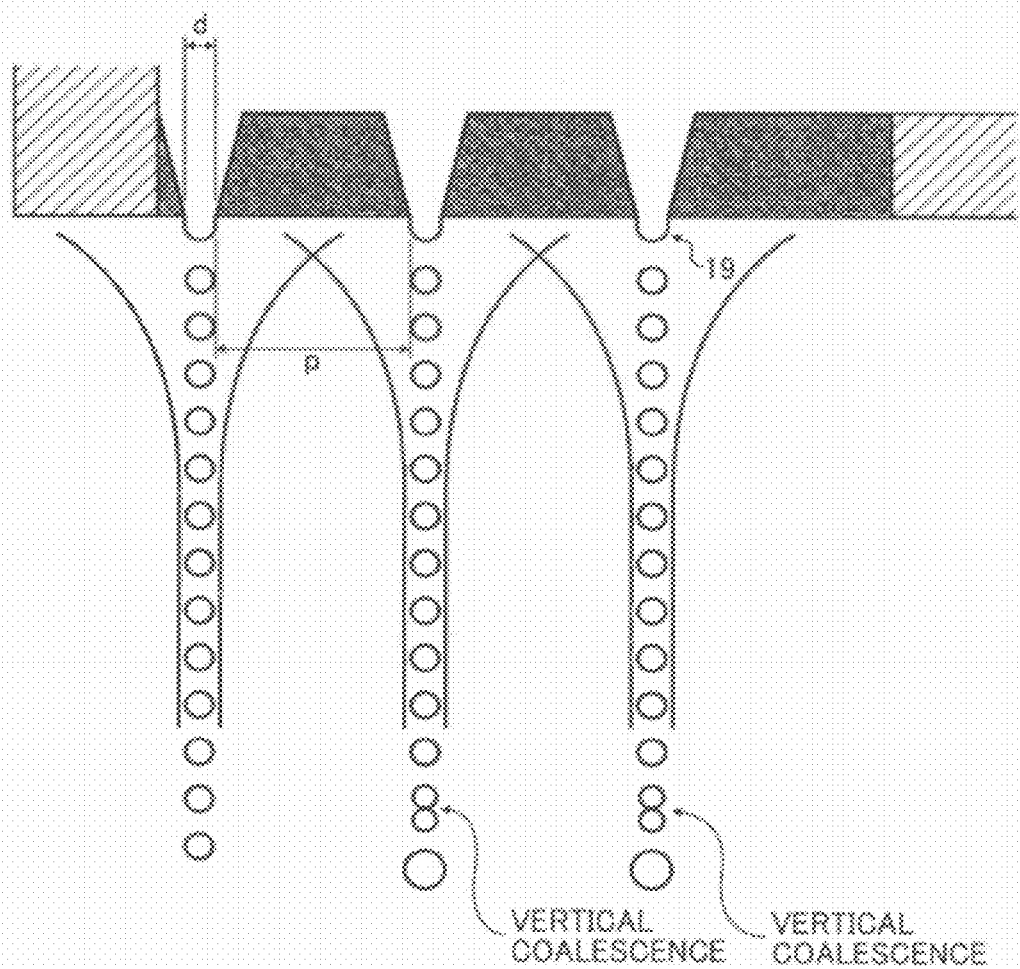
FIG. 5 is a schematic view illustrating the occurrence of vertical coalescence of liquid droplets.

To prevent coalescence of liquid droplets, an interval p between adjacent nozzles 19 is preferably 6 to 160 µm. When the interval p is too small or large, liquid droplets discharged from adjacent nozzles 19 are so close to each other that they may laterally coalesce. This phenomenon in which liquid droplets get coalesced with those discharged from an adjacent nozzle 19 is hereinafter referred to as lateral coalescence. The ratio p/d of the interval p to the outlet diameter d of the nozzles 19 is between 2.5 and 7.5. FIG. 4A is a schematic view illustrating the liquid droplet discharge head 11 and FIG. 4B is a magnified view of the area circled by a dotted line in FIG. 4A. When p, d and p/d are within the above-described ranges, no coalescence occurs, as illustrated in FIG. 4B, because accompanying air currents formed around adjacent liquid droplets are overlapped with each other. When p, d and p/d are beyond the above-described ranges, vertical coalescence occurs at about 2 to 5 mm below the nozzles 19, as illustrated in FIG. 5. This is because accompanying air currents formed around adjacent liquid droplets are not sufficiently overlapped with each other, and therefore the liquid droplets are decelerated. The interval p between adjacent nozzles 19 is defined as a minimum distance between certain points on the circumferences of adjacent nozzles 19, as is shown in FIG. 4B. Not all the nozzles 19 are necessarily in the above conditions but at least a pair of nozzles 19 is in the above conditions so that accompanying air currents formed around adjacent liquid droplets are overlapped with each other. Multiple pairs of nozzles 19 in the above conditions may be distributed over the entire region of the liquid droplet discharge head 11.

A mechanism of liquid droplet formation in the liquid droplet forming unit 10 is described in detail below. First, a mechanism of liquid column resonance in the liquid column resonance liquid chamber 18 is described referring to FIG. 2. The resonant wavelength λ is represented by the following formula (1):

$$\lambda = c/f \qquad (1)$$

wherein c represents a sonic speed in the toner constituents liquid in the liquid column resonance liquid chamber 18 and f represents a drive frequency given to the toner constituents liquid from the vibration generator 20.

In FIG. 2, L represents a length between the fixed end of the frame of the liquid column resonance liquid chamber 18 and the other end thereof closer to the liquid common supply path 17; h1 (about 80 µm) represents a height of the end of the frame of the liquid column resonance liquid chamber 18 closer to the liquid common supply path 17; and h2 (about 40 µm) represents a height of a communication opening between the liquid column resonance liquid chamber 18 and the liquid common supply path 17. Here, h1 is twice as much as h2. When both ends are fixed (i.e., closed), resonance most effectively occurs when the length L is an even multiple of λ/4. In this case, the length L is represented by the following formula (2):

$$L = (N/4)\lambda \qquad (2)$$

wherein N represents an even number.

The formula (2) is also satisfied when both ends are open. Similarly, when one end is open (so that pressure can be released) and the other end is closed (i.e., fixed), resonance most effectively occurs when the length L is an odd multiple of λ/4. In this case, the length L is represented by the formula (2) as well, wherein N represents an odd number.

Thus, the most effective drive frequency f is derived from the formulae (1) and (2) and represented by the following formula (3):

$$f = N \times c/(4L) \qquad (3)$$

Actually, vibration is not infinitely amplified because the liquid attenuates resonance due to its viscosity. Therefore, resonance can occur even at a frequency around the most effective drive frequency f represented by the formula (3).

Figure 6A:
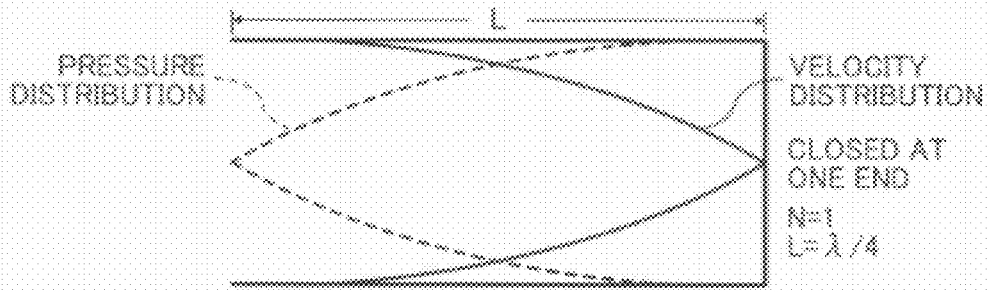
FIGS. 6A to 6D show wave configurations (i.e., resonant modes) of velocity and pressure standing waves when N is 1, 2, or 3.
Figure 6B:
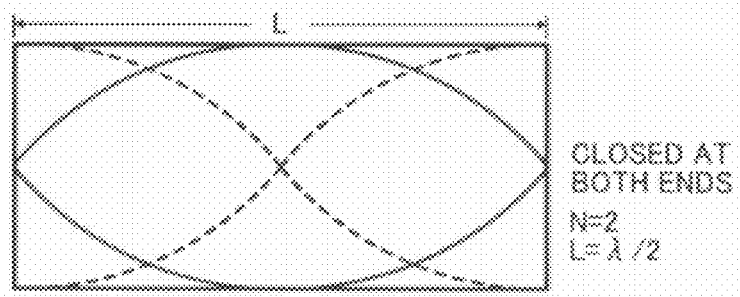
Figure 6C:
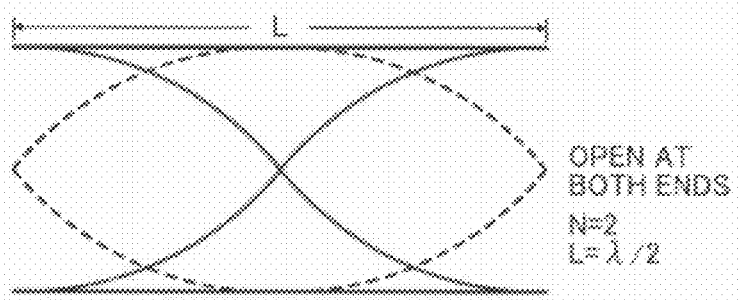
Figure 6D:
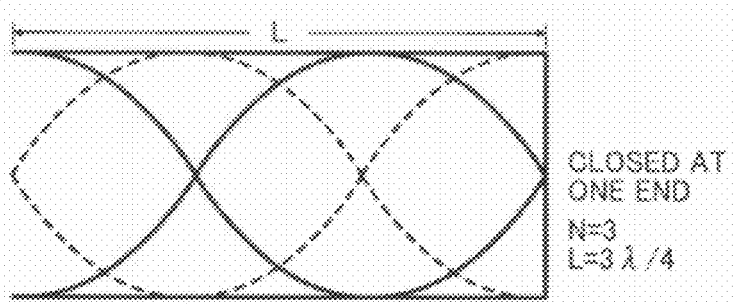
Figure 7A:
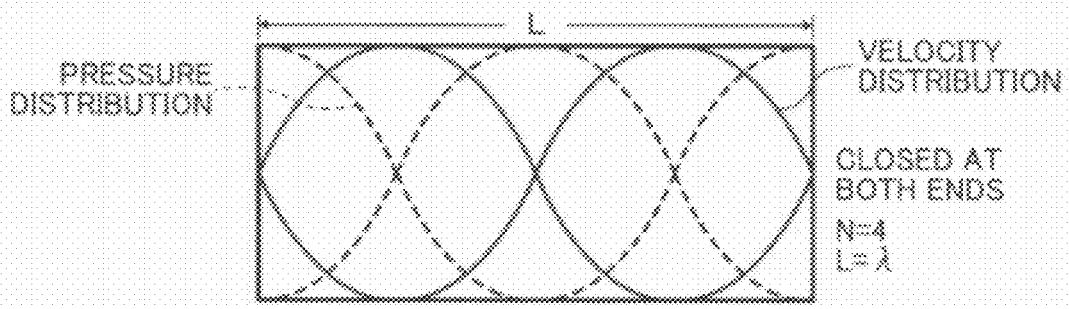
FIGS. 7A to 7C show wave configurations (i.e., resonant modes) of velocity and pressure standing waves when N is 4 or 5.
Figure 7B:
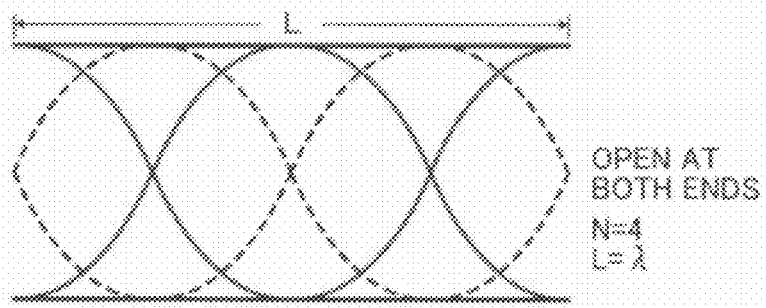
Figure 7C:
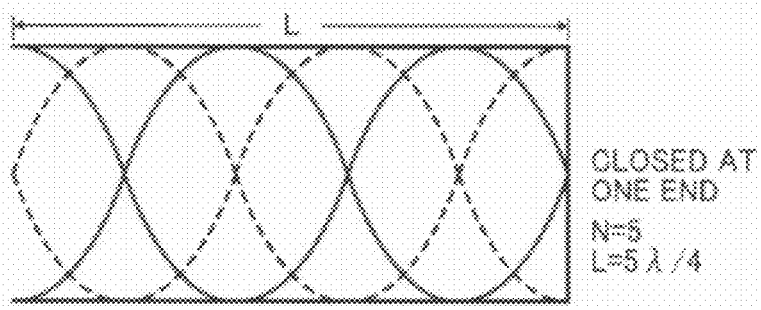

FIGS. 6A to 6D show wave configurations (i.e., resonant modes) of velocity and pressure standing waves when N is 1, 2, or 3. FIGS. 7A to 7C show wave configurations (i.e., resonant modes) of velocity and pressure standing waves when N is 4 or 5. The standing waves are longitudinal waves in actuality, but are generally illustrated as shown in FIGS. 6A to 6D and FIGS. 7A to 7C. In FIGS. 6A to 6D and FIGS. 7A to 7C, solid lines represent velocity standing waves and dotted lines represent pressure standing waves. Referring to FIG. 6A, when one end is closed and N is 1, amplitude of the velocity standing wave is zero at the closed end and is maximum at the open end. When the length between both longitudinal ends of the liquid column resonance liquid chamber 18 is L and the resonant wavelength of the liquid is λ, standing waves most effectively occur when N is an integer of 1 to 5. Wave configurations of the standing waves depend on whether either end is open or closed. Whether either end is open or closed depends on conditions of nozzles and/or supply openings. In acoustics, a closed end is defined as a point at which longitudinal velocity of a medium (e.g., a liquid) is zero and pressure thereof is maximum. An open end is defined as a point at which pressure of the medium is zero. The closed end is acoustically considered as a hard wall that reflects waves. Resonant standing waves as illustrated in FIGS. 6A to 6D and FIGS. 7A to 7C occur when each end is ideally completely closed or open. Configurations of standing waves vary depending on the number and/or arrangement of the nozzles. Thus, resonant frequency can appear even at a position displaced from the position derived from the formula (3). Thus, stable discharge conditions can be created by adjusting the drive frequency. For example, when the sonic speed c in the liquid is 1,200 m/s, the length L between both ends of the liquid column resonance liquid chamber 18 is 1.85 mm, both ends are fixed with wall surfaces, i.e., both ends are closed, and N is 2, the most effective resonant frequency is derived from the formula (3) as 324 kHz. For another example, when the sonic speed c in the liquid is 1,200 m/s, the length L between both ends of the liquid column resonance liquid chamber 18 is 1.85 mm, both ends are fixed with wall surfaces, i.e., both ends are closed, and N is 4, the most effective resonant frequency is derived from the formula (3) as 648 kHz. Higher resonance can occur in the same liquid column resonance liquid chamber 18.

To increase frequency, preferably, both ends of the liquid column resonance liquid chamber 18 are equivalent to closed ends or are regarded as acoustically soft walls under the influence of the nozzle openings. Of course, both ends may be equivalent to open ends. The influence of the nozzle openings means a lesser acoustic impedance and a greater compliance component. Preferably, the liquid column resonance liquid chamber 18 has wall surfaces on both longitudinal ends, as illustrated in FIG. 6B and FIG. 7A, because all possible resonant modes are available as if both ends are closed or one end is open.

The drive frequency depends on the number, arrangement, and cross-sectional shape of the nozzles 19. For example, as the number of the nozzles 19 increases, closed ends of the liquid column resonance liquid chamber 18 are gradually released from restriction. As a result, a resonant standing wave is generated as if both ends are substantially open, and the drive frequency is increased. The restriction releases from the position of the nozzle 19 provided closest to the liquid supply path 17. Actually, the cross-sectional shape of each nozzle 19 may be a round shape or the volume of each nozzle 19 may vary depending on the frame thickness. Thus, the actual standing wave has a shorter wavelength and a higher frequency than the drive frequency. Upon application of a voltage to the vibration generator 20 with the drive frequency thus determined, the vibration generator 20 deforms so as to generate a resonant standing wave most effectively. A liquid column resonant standing wave can generate even at a frequency around the most effective drive frequency for generating a resonant standing wave. When the vibration generator 20 vibrates at a drive frequency f satisfying the following formulae (4) and (5), a liquid column resonance is generated and liquid droplets are discharged from the nozzles 19: wherein L represents a length between both longitudinal ends of the liquid column resonance liquid chamber 18 and Le represents a distance between a longitudinal end of the liquid column resonance liquid chamber 18 on which a liquid common supply path 17 is provided and the nozzle 19 closest to the longitudinal end.

$$N \times c/(4L) \leq f \leq N \times c/(4Le) \qquad (4)$$

$$N \times c/(4L) \leq f \leq (N+1) \times c/(4Le) \qquad (5)$$

Preferably, Le/L>0.6 is satisfied.

According to the above-described principle of liquid column resonance, a pressure standing wave is formed in the liquid column resonance liquid chamber 18 and liquid droplets are continuously discharged from the nozzles 19 provided on a part of the liquid column resonance liquid chamber 18 as illustrated in FIG. 2. When the nozzles 19 are provided at a position of the maximum amplitude of the pressure standing wave, discharge efficiency becomes maximum, which allows low-voltage driving. In terms of productivity, more than one nozzles 19 are preferably provided. In particular, the number of the nozzles 19 is preferably 2 to 100. When the number of the nozzles 19 is too large, the vibration generator 20 requires a higher voltage in forming desired-size liquid droplets, resulting in unstable behavior of the piezoelectric body as the vibration generator 20. To prevent coalescence of liquid droplets, the interval between the nozzles 19 is preferably 6 μm to 160 μm.

Details of liquid column resonance generated in the liquid column resonance liquid chamber 18 are described with reference to FIGS. 8A to 8E. In FIGS. 8A to 8E, solid lines represent velocity distributions at arbitrary points within the liquid column resonance liquid chamber 18. With respect to velocity, the direction from the liquid common supply path 17 side toward the liquid column resonance liquid chamber 18 is defined as the plus (+) direction and the opposite direction is defined as the minus (−) direction. Dotted lines represent pressure distributions at arbitrary points within the liquid column resonance liquid chamber 18. A positive (+) pressure and a negative (−) pressure relative to atmospheric pressure respectively create downward and upward pressures in FIGS. 8A to 8E. In FIGS. 8A to 8E, a height (equivalent to h1 in FIG. 2) of the end of the frame of the liquid column resonance liquid chamber 18 closer to the liquid common supply path 17 is twice as much as a height (equivalent to h2 in FIG. 2) of the communication opening between the liquid column resonance liquid chamber 18 and the liquid common supply path 17. FIGS. 8A to 8E represent temporary variations in velocity and pressure distributions under the assumption that both ends of the liquid column resonance liquid chamber 18 are approximately closed.

Figure 8A:
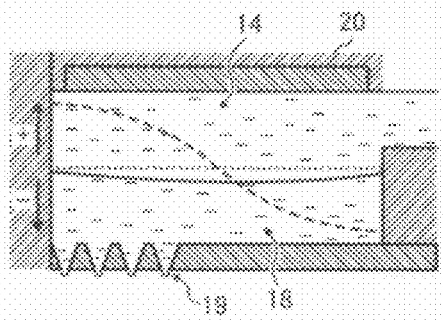
FIGS. 8A to 8E represent temporary variations in velocity and pressure distributions in the liquid column resonance liquid chamber.
Figure 8B:
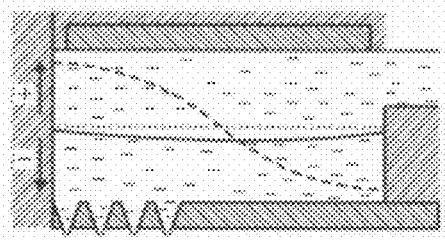
Figure 8C:
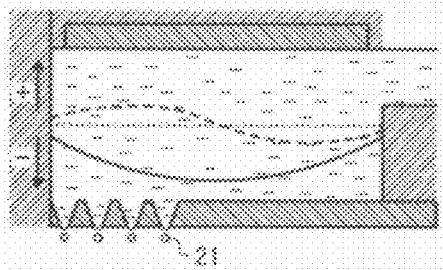

FIG. 8A shows pressure and velocity wave configurations within the liquid column resonance liquid chamber 18 when liquid droplets are being discharged. FIG. 8B shows that meniscus pressure gradually increases again immediately after liquid droplets have been discharged and the liquid has drawn back. In FIGS. 8A and 8B, the pressure within the liquid column resonance liquid chamber 18 becomes maximum at the position where the nozzles 19 are provided. Thereafter, as illustrated in FIG. 8C, the positive pressure around the nozzles 19 decreases toward negative pressures so as to start discharging liquid droplets 21.

Figure 8D:
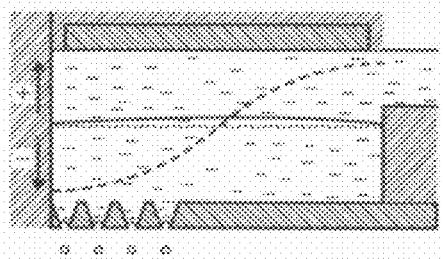
Figure 8E:

Thereafter, as illustrated in FIG. 8D, when the pressure around the nozzles 19 becomes minimum, the toner constituents liquid 14 starts filling the liquid column resonance liquid chamber 18. Thereafter, as illustrated in FIG. 8E, the negative pressure around the nozzles 19 increases toward positive pressures. Thus, the toner constituents liquid 14 stops filling the liquid column resonance liquid chamber 18. Thereafter, as illustrated in FIG. 8A, the pressure within the liquid column resonance liquid chamber 18 becomes maximum again at the position where the nozzles 19 are provided so as to start discharging liquid droplets 21 again. In summary, a standing wave is generated in liquid column resonance caused by a high-frequency driving of the generation vibrator 20 within the liquid column resonance liquid chamber 18. The nozzles 19 are provided to the position corresponding to antinodes of the standing wave at which the pressure amplitude becomes maximum. Thus, toner liquid droplets 21 are continuously discharged from the nozzles 19 in accordance with the cycle of the antinodes.

Figure 9:
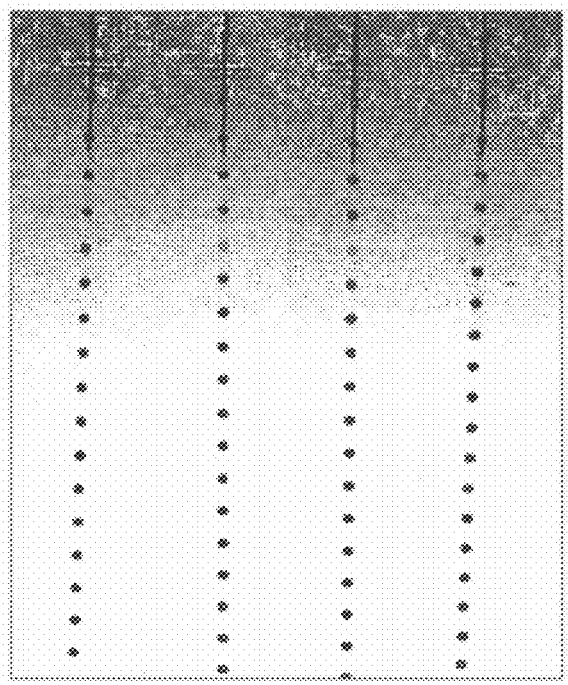
FIG. 9 shows an image of liquid droplet discharge obtained by a laser shadowgraph method.
Figure 10:
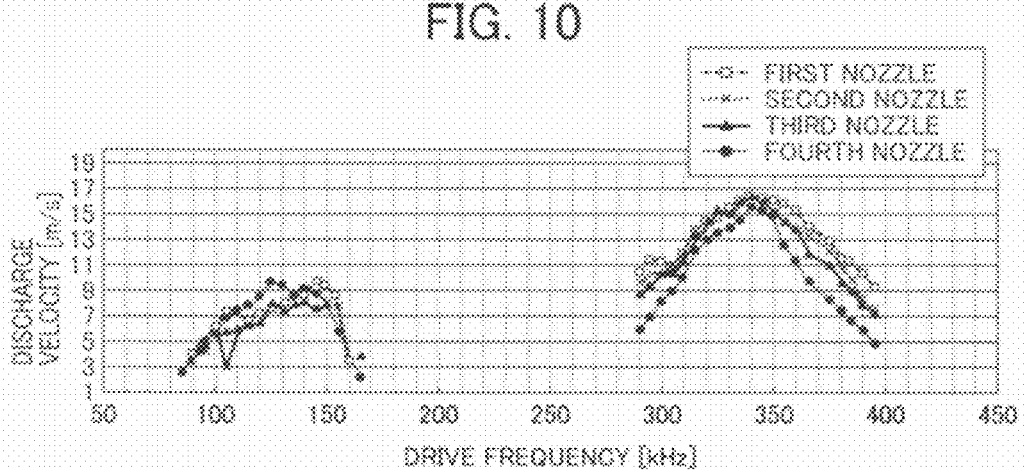
FIG. 10 shows relations between drive frequency and discharge velocity.

An exemplary embodiment that causes liquid droplet discharge by the principle of liquid column resonance is described in detail below. In the present embodiment, referring to FIG. 2, the length L between both longitudinal ends of the liquid column resonance liquid chamber 18 is 1.85 mm and the resonant mode N is 2. The first to fourth nozzles are provided to the position corresponding to antinodes of the pressure standing wave. FIG. 9 shows an image of liquid droplet discharge obtained by a laser shadowgraph method when the discharge is caused by a sine wave having a drive frequency of 340 kHz. It is clear from FIG. 9 that the discharged liquid droplets are very uniform in both particle size and discharge velocity. FIG. 10 shows relations between drive frequency and discharge velocity when the liquid droplet discharge is caused by sine waves having a driving frequency between 290 and 395 kHz with the same amplitude. It is clear from FIG. 10 that the discharge velocity becomes maximum and uniform when the drive frequency is around 340 kHz in all the first to fourth nozzles. Accordingly, it is clear that the liquid droplet discharge is caused at the position corresponding to antinodes of the standing wave generated in liquid column resonance having a frequency of 340 kHz, which is the second resonant mode. It is also clear from FIG. 10 that liquid droplet discharge is not caused between drive frequencies of 130 kHz (i.e., the first resonant mode) and 340 kHz (i.e., the second resonant mode), at which the discharge velocity becomes local maximum. This clearly indicates generation of standing wave in liquid column resonance.

Figure 11:
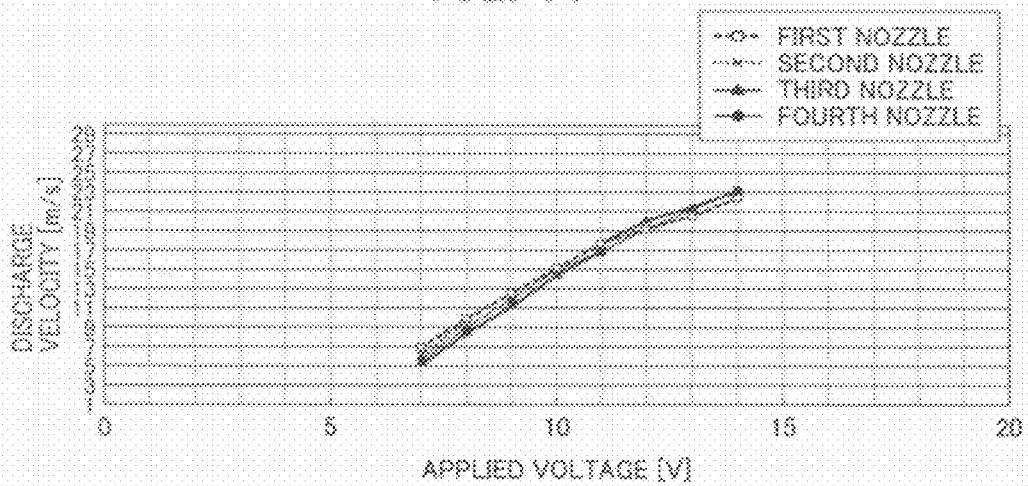
FIG. 11 shows relations between applied voltage and discharge velocity.
Figure 12:
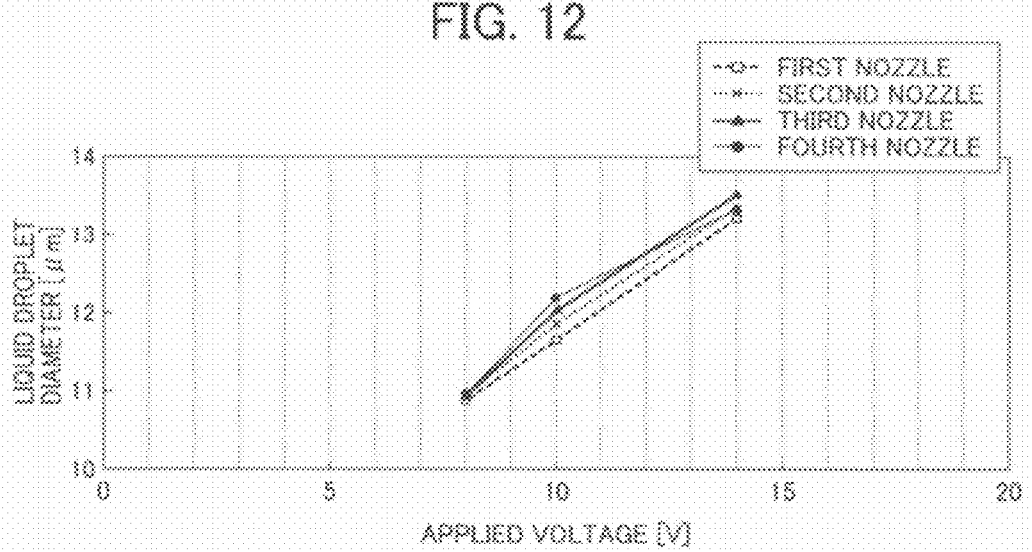
FIG. 12 shows relations between applied voltage and liquid droplet diameter.

FIG. 11 shows relations between applied voltage and discharge velocity. FIG. 12 shows relations between applied voltage and liquid droplet diameter. It is clear from FIGS. 11 and 12 that both discharge velocity and liquid droplet diameter monotonically increase as applied voltage increases. Thus, both discharge velocity and liquid droplet diameter can be arbitrarily adjusted by controlling the applied voltage.

The following examples show toner manufacturing apparatuses according to exemplary embodiments of the invention. They show relations between standing waves and the number, pattern, and arrangement of the nozzles. These examples are provided herein for the purpose of illustration only and are not intended to be limiting. In the descriptions in the following examples, the numbers represent weight ratios in parts, unless otherwise specified. In the following examples, resonant frequency can be determined by experimentally varying discharge frequency. The examples also include evaluation results of toners obtained with the toner manufacturing apparatuses.

EXAMPLE 1

In Example 1, the liquid droplet discharge head 11 illustrated in FIG. 2 was used. A standing wave with the resonant mode N of 2 was generated while fixing both ends. The drive frequency was 328 kHz, which was a resonant peak frequency. The resonant peak frequency is a frequency at which discharge velocity becomes maximum, which can be experimentally determined from a graph as shown in FIG. 8. The resonant peak frequency is generally obtained at a node of a velocity standing wave and an antinode of a pressure standing wave generated in liquid column resonance, at which pressure becomes maximum.

Preparation of Colorant Dispersion

First, 17 parts of a carbon black (REGAL 400 from Cabot Corporation), 3 parts of a colorant dispersant (AJISPER PB821 from Ajinomoto Fine-Techno Co., Inc.), and 80 parts of ethyl acetate were mixed with a mixer having agitation blades. Thus, a primary colorant dispersion was prepared. The primary colorant dispersion was further dispersed with strong shearing force using a DYNOMILL to completely remove aggregations having a size greater than 5 μm. Thus, a colorant dispersion was prepared.

Preparation of Wax Dispersion

First, 18 parts of a carnauba wax, 2 parts of a wax dispersant (i.e., a polyethylene wax grafted with a styrene-butyl acrylate copolymer), and 80 parts of ethyl acetate were mixed with a mixer having agitation blades. Thus, a primary wax dispersion was prepared. The primary wax dispersion was heated to 80° C. while being agitated so that the carnauba wax was dissolved, and subsequently cooled to room temperature so that particles of the carnauba wax having a maximum diameter of 3 μm or less were deposited. Thereafter, the primary wax dispersion was further dispersed with strong shearing force using a DYNOMILL so that the maximum diameter became 1 μm or less. Thus, a wax dispersion was prepared.

Preparation of Toner Constituents Liquid

A toner constituents liquid was prepared by uniformly mixing 100 parts of a polyester resin (i.e., a binder resin), 30 parts of the colorant dispersion, 30 parts of the wax dispersion, and 840 parts of ethyl acetate for 10 minutes using a mixer having agitation blades. Neither the colorant particles nor the wax particles aggregated due to solvent shock.

Preparation of Toner

The toner constituents liquid thus prepared was set to the toner manufacturing apparatus illustrated in FIG. 1 having the liquid droplet discharge head 11 illustrated in FIG. 2. The toner constituents liquid was formed into liquid droplets under the following conditions, and the liquid droplets were dried and solidified into mother toner particles.

Discharge Conditions

Length of liquid column resonance liquid chamber: 1.85 mm
Number of nozzles: 10
Diameter of nozzles: 8.0 μm
Interval between nozzles: 60 μm Toner Manufacturing Conditions Specific weight of dispersion: $\rho=1.1888$ g/cm$^3$
Internal temperature: 27-28° C.
Drive frequency: 340 kHz
Peak vale of applied voltage sine wave: 10.0 V The dried and solidified mother toner particles were exposed to soft X-ray to be electrically neutralized, and then collected by suction with a filter having pores of 1 μm. The collected mother toner particles were subjected to a measurement of particle size distribution with a flow particle image analyzer (FPIA-2000 from Sysmex Corporation). As a result, the mother toner particles had a weight average particle diameter (D4) of 5.5 μm and a number average particle diameter (Dn) of 5.0 μm. The particle size distribution (D4/Dn) was 1.10.

An exemplary measurement procedure using FPIA-2000 is described below. First, several drops of a nonionic surfactant (preferably CONTAMINON N from Wako Pure Chemical Industries, Ltd.) are added to 10 ml of water from which fine foreign substances have been previously removed by a filter. The water is containing particles having a circle-equivalent diameter which falls within the measuring range (e.g., 0.60 to 159.21 μm) in a number only 20 or less per $10^{-3}$ cm$^3$. After adding 5 mg of a sample, the resulting liquid is subjected to a dispersion treatment for 1 minute using an ultrasonic disperser UH-50 from STM at 20 kHz and 50 W/10 cm$^3$. The liquid is subjected to this dispersion treatment for 5 minutes in total. The resulting sample dispersion is containing 4,000 to 8,000 particles per $10^{-3}$ cm$^3$, the particles having a circle-equivalent diameter which falls within the measuring range of not less than 0.60 μm and less than 159.21 μm.

The sample dispersion is passed through a flow path of a flat transparent flow cell having a thickness of about 200 μm. A stroboscopic lamp and a CCD camera are respectively provided on opposite sides of the flow cell so that an optical path is formed crossing the thickness direction of the flow cell. While the sample dispersion is flowing, the stroboscopic lamp emits light at an interval of 1/30 seconds to obtain a two-dimensional image of the particles flowing in the flow cell. The image is parallel to a part of the flow cell. Circle-equivalent diameter of each particle is calculated as a circle having the same area as the two-dimensional image of the particle.

More than 1,200 particles can be subjected to the measurement of circle-equivalent diameter in about 1 minute. Thus, a number distribution and a ratio (% by number) of particles having a specific circle-equivalent diameter can be determined. In the resulting frequency and cumulative distributions (%), a range of 0.06 to 400 μm is divided into 226 channels (i.e., 1 octave is divided into 30 channels). The actual measuring range is not less than 0.60 μm and less than 159.21 μm.

External Treatment

After being collected by cyclone, the dried and solidified mother toner particles were mixed with 1.0% of a hydrophobized silica (H2000 from Clariant Japan K.K.) using a HENSCHEL MIXER (from Mitsui Mining Co., Ltd.). Thus, a toner was prepared.

Preparation of Carrier

A coating layer dispersion in which a silicone resin was dispersed in toluene was spray-coated on a core material (i.e., a spherical ferrite particle having an average particle diameter of 50 μm), followed by burning and cooling. Thus, a carrier having a coating layer having an average thickness of 0.2 μm was prepared.

Preparation of Developer

A two-component developer was prepared by mixing 4 parts of the toner and 96 parts of the carrier.

Evaluation of Thin Line Reproducibility

The above-prepared developer was set in a commercially-available copier (IMAGIO NEO 271 from Ricoh Co., Ltd.) and a running test was performed. In the running test, an image having an image occupancy of 7% was continuously printed on a paper TYPE 6000 (from Ricoh Co., Ltd.). The 10th image (i.e., an initial image) and the 30,000th image were visually observed with an optical microscope at a magnification of 1,000,000 to evaluate thin line reproducibility to be graded on a 4-point scale (A, B, C, and D). A is the best and D is the worst. The grade D is not suitable for practical use. The evaluation results are shown in Table 1. In Example 1, neither vertical nor lateral coalescence occurred and thin line reproducibility was very good.

TABLE 1

|  | Outlet diameter (d) of nozzles (μm) | Interval (p) between nozzles (μm) | p/d | Number average particle diameter (Dn) of toner (μm) | D4/Dn | Thin line reproducibility | Initial discharge velocity (m/s) | Occurrence of coalescence |
|---|---|---|---|---|---|---|---|---|
| Example 1 | 8 | 60 | 7.5 | 5 | 1.1 | A | 8 | No |
| Example 2 | 6 | 30 | 5 | 4.2 | 1.08 | A | 8 | No |
| Example 3 | 10 | 75 | 7.5 | 5.8 | 1.18 | B | 10 | No |
| Example 4 | 12 | 30 | 2.5 | 5.7 | 1.05 | B | 8 | No |
| Example 5 | 8 | 20 | 2.5 | 5.1 | 1.06 | A | 8 | No |
| Example 6 | 4.2 | 20 | 4.76 | 3.95 | 1.10 | A | 8 | No |
| Example 7 | 4.2 | 30 | 7.14 | 4.0 | 1.06 | A | 8 | No |
| Example 8 | 14.8 | 40 | 2.7 | 6.8 | 1.09 | B | 8 | No |
| Example 9 | 14.7 | 110 | 7.48 | 6.5 | 1.06 | B | 8 | No |
| Comparative Example 1 | 8 | 6 | 0.75 | 8.2 | 1.8 | D | 8 | Lateral coalescence occurred |
| Comparative Example 2 | 10 | 100 | 10 | 6.2 | 1.4 | D | 10 | Vertical coalescence occurred |

EXAMPLE 2

The procedure in Example 1 is repeated except for changing the peak value of the applied voltage sine wave to 8 V, the interval between nozzles to 30 μm, and the diameter of nozzles to 6.0 μm. The obtained toner has a number average particle diameter (Dn) of 4.2 μm and the particle size distribution D4/Dn is 1.08. In Example 2, p/d is 5. In Example 2, neither vertical nor lateral coalescence occur and thin line reproducibility is very good.

EXAMPLE 3

The procedure in Example 1 is repeated except for changing the peak value of the applied voltage sine wave to 11 V, the interval between nozzles to 75 μm, and the diameter of nozzles to 10.0 μm. The obtained toner has a number average particle diameter (Dn) of 5.8 μm and the particle size distribution D4/Dn is 1.18. In Example 3, p/d is 7.5. In Example 3, neither vertical nor lateral coalescence occur and thin line reproducibility is good.

EXAMPLE 4

The procedure in Example 1 is repeated except for changing the peak value of the applied voltage sine wave to 13 V, the interval between nozzles to 75 μm, and the diameter of nozzles to 12.0 μm. The obtained toner has a number average particle diameter (Dn) of 5.7 μm and the particle size distribution D4/Dn is 1.05. In Example 4, p/d is 2.5. In Example 4, neither vertical nor lateral coalescence occur and thin line reproducibility is good.

EXAMPLE 5

The procedure in Example 1 is repeated except for changing the peak value of the applied voltage sine wave to 10 V, the interval between nozzles to 20 μm, and the diameter of nozzles to 8.0 μm. The cross-sectional shape of the nozzle is straight. The obtained toner has a number average particle diameter (Dn) of 5.1 μm and the particle size distribution D4/Dn is 1.06. In Example 5, p/d is 2.5. In Example 5, neither vertical nor lateral coalescence occur and thin line reproducibility is good.

EXAMPLE 6

The procedure in Example 1 is repeated except for changing the peak value of the applied voltage sine wave to 10 V, the interval between nozzles to 20 μm, and the diameter of nozzles to 4.2 μm. The cross-sectional shape of the nozzle is straight. The obtained toner has a number average particle diameter (Dn) of 3.95 μm and the particle size distribution D4/Dn is 1.10. In Example 6, p/d is 4.75. In Example 6, neither vertical nor lateral coalescence occur and thin line reproducibility is good.

EXAMPLE 7

The procedure in Example 1 is repeated except for changing the peak value of the applied voltage sine wave to 10 V, the interval between nozzles to 30 μm, and the diameter of nozzles to 4.2 μm. The cross-sectional shape of the nozzle is straight. The obtained toner has a number average particle diameter (Dn) of 4.0 μm and the particle size distribution D4/Dn is 1.06. In Example 7, p/d is 7.14. In Example 7, neither vertical nor lateral coalescence occur and thin line reproducibility is good.

EXAMPLE 8

The procedure in Example 1 is repeated except for changing the peak value of the applied voltage sine wave to 9.0 V, the interval between nozzles to 40 μm, and the diameter of nozzles to 14.8 μm. The cross-sectional shape of the nozzle is straight. The obtained toner has a number average particle diameter (Dn) of 6.8 μm and the particle size distribution D4/Dn is 1.09. In Example 8, p/d is 2.7. In Example 8, neither vertical nor lateral coalescence occur and thin line reproducibility is good.

EXAMPLE 9

The procedure in Example 1 is repeated except for changing the peak value of the applied voltage sine wave to 9.0 V, the interval between nozzles to 110 μm, and the diameter of nozzles to 14.7 μm. The obtained toner has a number average particle diameter (Dn) of 6.5 μm and the particle size distribution D4/Dn is 1.06. In Example 9, p/d is 7.48. In Example 9, neither vertical nor lateral coalescence occur and thin line reproducibility is good.

COMPARATIVE EXAMPLE 1

The procedure in Example 1 was repeated except for changing the interval between nozzles to 6 μm. The obtained toner had a number average particle diameter (Dn) of 8.2 μm and the particle size distribution D4/Dn was 1.8. In Comparative Example 1, liquid droplets discharged from adjacent nozzles were laterally coalesced and a part of the liquid droplets were further vertically coalesced.

COMPARATIVE EXAMPLE 2

The procedure in Example 1 is repeated except for changing the interval between nozzles to 100 μm and the diameter of nozzles to 10.0 μm. The obtained toner has a number average particle diameter (Dn) of 6.2 μm and the particle size distribution D4/Dn is 1.4. In Comparative Example 2, liquid droplets discharged from the same nozzle are vertically coalesced with the one-cycle-preceding liquid droplets.

The toner according to exemplary aspects of the invention may be obtained by the toner manufacturing apparatus according to exemplary aspects of the invention. The toner is substantially monodisperse.

The particle size distribution (i.e., the ratio of weight average molecular weight to number average molecular weight) of the toner is preferably 1.00 to 1.15, and more preferably 1.00 to 1.05. The weight average particle diameter of the toner is preferably 1 to 20 μm, and more preferably 3 to 10 μm.

The toner is prepared by dissolving or dispersing toner constituents, such as a binder resin, a colorant, and a release agent, to prepare a toner constituents liquid, forming the toner constituents liquid into liquid droplets, and drying and solidifying the liquid droplets into toner particles.

The toner constituents include a binder resin, a colorant, and a wax. The toner constituents may further include other materials such as a charge controlling agent, if needed.

Specific examples of usable binder resins include, but are not limited to, vinyl homopolymers and copolymers of styrene monomers, acrylic monomers, and/or methacrylic monomers, polyester polymers, polyol resins, phenol resins, silicone resins, polyurethane resins, polyamide resins, furan resins, epoxy resins, xylene resins, terpene resins, coumarone indene resins, polycarbonate resins, and petroleum resins.

Specific examples of the styrene monomers include, but are not limited to, styrene, o-methylstyrene, m-methylstyrene, p-methylstyrene, p-phenylstyrene, p-ethylstyrene, 2,4-dimethylstyrene, p-n-amylstyrene, p-tert-butylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dichlorostyrene, m-nitrostyrene, o-nitrostyrene, p-nitrostyrene, and derivatives thereof.

Specific examples of the acrylic monomers include, but are not limited to, acrylic acids and esters thereof such as methyl acrylate, ethyl acrylate, propyl acrylate, n-butyl acrylate, isobutyl acrylate, n-octyl acrylate, n-dodecyl acrylate, 2-ethylhexyl acrylate, stearyl acrylate, 2-chloroethyl acrylate, and phenyl acrylate.

Specific examples of the methacrylic monomers include, but are not limited to, methacrylic acids and esters thereof such as methyl methacrylate, ethyl methacrylate, propyl methacrylate, n-butyl methacrylate, isobutyl methacrylate, n-octyl methacrylate, n-dodecyl methacrylate, 2-ethylhexyl methacrylate, stearyl methacrylate, phenyl methacrylate, dimethylaminoethyl methacrylate, and diethylaminoethyl methacrylate.

The vinyl homopolymers and copolymers may be formed from the following monomers (1) to (18). (1) Monoolefins, such as ethylene, propylene, butylene, and isobutylene. (2) Polyenes, such as butadiene and isoprene. (3) Vinyl halides, such as vinyl chloride, vinylidene chloride, vinyl bromide, and vinyl fluoride. (4) Vinyl esters, such as vinyl acetate, vinyl propionate, and vinyl benzoate. (5) Vinyl ethers, such as vinyl methyl ether, vinyl ethyl ether, and vinyl isobutyl ether. (6) Vinyl ketones, such as vinyl methyl ketone, vinyl hexyl ketone, and methyl isopropenyl ketone. (7) N-Vinyl compounds, such as N-vinyl pyrrole, N-vinyl carbazole, N-vinyl indole, and N-vinyl pyrrolidone. (8) Vinylnaphthalenes. (9) Acrylic acid and methacrylic acid derivatives, such as acrylonitrile, methacrylonitrile, and acrylamide. (10) Unsaturated dibasic acids, such as maleic acid, citraconic acid, itaconic acid, alkenyl succinic acid, fumaric acid, and mesaconic acid. (11) Unsaturated dibasic acid anhydrides, such as maleic acid anhydride, citraconic acid anhydride, itaconic acid anhydride, and alkenyl succinic acid anhydride. (12) Monoesters of unsaturated dibasic acids, such as maleic acid monomethyl ester, maleic acid monoethyl ester, maleic acid monobutyl ester, citraconic acid monomethyl ester, citraconic acid monoethyl ester, citraconic acid monobutyl ester, itaconic acid monomethyl ester, alkenyl succinic acid monomethyl ester, fumaric acid monomethyl ester, and mesaconic acid monomethyl ester. (13) Unsaturated dibasic acid esters, such as dimethyl maleic acid and dimethyl fumaric acid. (14) α,β-Unsaturated acids, such as crotonic acid and cinnamic acid. (15) α,β-Unsaturated acid anhydrides, such as crotonic acid anhydride and cinnamic acid anhydride. (16) Carboxyl-group-containing monomers, such as anhydrides between α,β-unsaturated acids and lower fatty acids; and alkenyl malonic acid, alkenyl glutaric acid, alkenyl adipic acid, and anhydrides and monoesters thereof. (17) Hydroxyalkyl esters of acrylic acids and methacrylic acids, such as 2-hydroxyethyl acrylate, 2-hydroxyethyl methacrylate, and 2-hydroxypropyl methacrylate. (18) Hydroxyl-group-containing monomers, such as 4-(1-hydroxy-1-methylbutyl)styrene and 4-(1-hydroxy-1-methyhexyl)styrene.

The vinyl homopolymers and copolymers may include a cross-linking structure formed from a cross-linking agent having 2 or more vinyl groups. Specific examples of such cross-linking agents include, but are not limited to, aromatic divinyl compounds such as divinylbenzene and divinylnaphthalene. Diacrylate compounds in which acrylates are bonded with an alkyl chain are also usable, such as ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, ethylene glycol dimethacrylate, 1,3-butylene glycol dimethacrylate, 1,4-butanediol dimethacrylate, 1,5-pentanediol dimethacrylate, 1,6-hexanediol dimethacrylate, and neopentyl glycol dimethacrylate. Diacrylate compounds in which acrylates are bonded with an ether bond are also usable, such as diethylene glycol diacrylate, triethylene glycol diacrylate, tetraethylene glycol diacrylate, polyethylene glycol #400 diacrylate, polyethylene glycol #600 diacrylate, dipropylene glycol diacrylate, diethylene glycol dimethacrylate, triethylene glycol dimethacrylate, tetraethylene glycol dimethacrylate, polyethylene glycol #400 dimethacrylate, polyethylene glycol #600 dimethacrylate, and dipropylene glycol dimethacrylate.

Diacrylate and dimethacrylate compounds in which acrylates and methacrylates, respectively, are bonded with a chain having an aromatic group and an ether bond are also usable. A commercially-available polyester-based diacrylate MANDA (from Nippon Kayaku Co., Ltd.) is also usable.

Additionally, polyfunctional cross-linking agents are also usable, such as pentaerythritol triacrylate, trimethylolethane triacrylate, trimethylolpropane triacrylate, tetramethylolmethane tetraacrylate, oligo ester acrylate, pentaerythritol trimethacrylate, trimethylolethane trimethacrylate, trimethylolpropane trimethacrylate, tetramethylolmethane tetramethacrylate, oligo ester methacrylate, triallyl cyanurate, and triallyl trimellitate.

The amount of the cross-linking agent is preferably 0.01 to 10 parts by weight, more preferably 0.03 to 5 parts by weight, based on 100 parts by weight of the monomer. Among the above-described cross-linking agents, aromatic divinyl compounds (preferably divinylbenzene) and diacrylate compounds in which acrylates are bonded with a chain having an aromatic group and an ether bond are preferable. In particular, combinations of a styrene copolymer and a styrene-acrylic copolymer are preferable.

The vinyl homopolymers and copolymers are obtained using a polymerization initiator. Specific examples of usable polymerization initiators include, but are not limited to, 2,2'-azobis isobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobis isobutyrate, 1,1'-azobis(1-cyclohexanecarbonitrile), 2-(carbamoylazo)-isobutyronitrile, 2,2'-azobis(2,4,4-trimethylpentane), 2-phenylazo-2',4'-dimethyl-4'-methoxyvaleronitrile, 2,2'-azobis(2-methylpropane), ketone peroxides (e.g., methyl ethyl ketone peroxide, acetyl acetone peroxide, cyclohexanone peroxide), 2,2-bis(tert-butylperoxy)butane, tert-butyl hydroperoxide, cumene hydroperoxide, 1,1,3,3-tetramethylbutyl hydroperoxide, di-tert-butyl peroxide, tert-butylcumyl peroxide, dicumyl peroxide, α-(tert-butylperoxy)isopropylbenzene, isobutyl peroxide, octanoyl peroxide, decanoyl peroxide, lauroyl peroxide, 3,5,5-trimethylhexanoyl peroxide, benzoyl peroxide, m-tolyl peroxide, di-isopropyl peroxydicarbonate, di-2-ethylhexyl peroxydicarbonate, di-n-propyl peroxydicarbonate, di-2-ethoxyethyl peroxycarbonate, di-ethoxyisopropyl peroxydicarbonate, di(3-methyl-3-methoxybutyl) peroxycarbonate, acetylcyclohexylsulfonyl peroxide, tert-butyl peroxyacetate, tert-butyl peroxyisobutyrate, tert-butyl peroxy-2-ethyl hexylate, tert-butyl peroxylaurate, tert-butyl-oxybenzoate, tert-butyl peroxyisopropyl carbonate, di-tert-butyl peroxyisophthalate, tert-butyl peroxyallyl carbonate, isoamyl peroxy-2-ethyl hexanoate, di-tert-butyl peroxyhexahydroterephthalate, and tert-butyl peroxyazelate.

THF-soluble components in a styrene-acrylic resin as the binder resin preferably has a molecular weight distribution such that at least one peak exists within a number average molecular weight range between 3,000 and 50,000 and at least one peak exists at a number average molecular weight of 100,000 or more, when measured by GPC (gel permeation chromatography), from the viewpoint of fixability, offset resistance, and storage stability of toner. THF-soluble components in the binder resin preferably includes components having a molecular weight of 100,000 or less in an amount of 50 to 90%. Also, THF-soluble components in the binder resin preferably has a molecular weight distribution such that a maximum peak exists within a molecular weight range between 5,000 and 30,000, more preferably between 5,000 and 20,000.

The vinyl polymers (e.g., styrene-acrylic resins) as the binder resin preferably have an acid value of 0.1 to 100 mgKOH/g, more preferably 0.1 to 70 mgKOH/g, and most preferably 0.1 to 50 mgKOH/g.

The polyester polymers may be formed from an alcohol and a carboxylic acid. Specific examples of suitable divalent alcohols for preparing the polyester polymer include, but are not limited to, ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, and diols obtained from a reaction between a cyclic ether (e.g., ethylene oxide, propylene oxide) and bisphenol A.

Tri- or more valent alcohols may be used in combination so that the resulting polyester polymer has cross-links. Specific examples of such tri- or more valent alcohols include, but are not limited to, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene.

Specific examples of suitable acids for preparing the polyester polymer include, but are not limited to, benzene dicarboxylic acids (e.g., phthalic acid, isophthalic acid, terephthalic acid) and anhydrides thereof, alkyl dicarboxylic acids (e.g., succinic acid, adipic acid, sebacic acid, azelaic acid) and anhydrides thereof, unsaturated dibasic acids (e.g., maleic acid, citraconic acid, itaconic acid, alkenylsuccinic acid, fumaric acid, mesaconic acid), and unsaturated dibasic acid anhydrides (e.g., maleic acid anhydride, citraconic acid anhydride, itaconic acid anhydride, alkenylsuccinic acid anhydride). Additionally, tri- or more valent carboxylic acids such as trimellitic acid, pyromellitic acid, 1,2,4-benzenetricarboxylic acid, 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, tetra(methylenecarboxyl)methane, 1,2,7,8-octanetetracarboxylic acid, enpol trimmer acid, and anhydrides and partial lower alkyl esters of these compounds, are also usable.

THF-soluble components in the polyester polymer as the binder resin preferably has a molecular weight distribution such that at least one peak exists within a number average molecular weight range between 3,000 and 50,000, when measured by GPC (gel permeation chromatography), from the viewpoint of fixability, offset resistance, and storage stability of toner. THF-soluble components in the binder resin preferably includes components having a molecular weight of 100,000 or less in an amount of 60 to 100%. Also, THF-soluble components in the binder resin preferably has a molecular weight distribution such that at least one peak exists within a molecular weight range between 5,000 and 20,000.

The polyester polymers as the binder resin preferably have an acid value of 0.1 to 100 mgKOH/g, more preferably 0.1 to 70 mgKOH/g, and most preferably 0.1 to 50 mgKOH/g.

Molecular weight distribution of the binder resin can be measured by gel permeation chromatography (GPC) using THF as a solvent.

At least one of the vinyl polymer and the polyester polymer may be formed from a monomer reactive with the other. For example, the polyester polymer may be formed from a monomer reactive with the vinyl polymer, such as an unsaturated dicarboxylic acid (e.g., phthalic acid, maleic acid, citraconic acid, itaconic acid) and anhydride thereof. For example, the vinyl polymer may be formed from a monomer such as a carboxyl-group-containing monomer, a hydroxyl-group-containing monomer, an acrylate, and a methacrylate.

When the binder resin is a mixture of two or more of these polymers, the mixture preferably includes a polymer having an acid value of 0.1 to 50 mgKOH/g in an amount of 60% by weight or more.

Acid value of the binder resin can be measured based on a method according to JIS K-0070 as follows.

(1) Substances other than the binder resin included in a sample should be previously removed. Alternatively, acid values and contents of the substances other than the binder resin included in the sample should be previously measured. Thereafter, 0.5 to 2.0 g of the pulverized sample are precisely weighed. For example, when the sample is a toner, acid values and contents of a colorant, a magnetic material, etc., included in the toner should be previously measured.

(2) The weighed sample is dissolved in 150 ml of a mixed solvent of toluene/ethanol (4/1 by volume) in a 300-ml beaker.

(3) The resulting liquid is subjected to a potentiometric titration using a 0.1 mol/l ethanol solution of KOH.

(4) Acid value of the binder resin is determined from the following formula, wherein W (g) represents the weight of the sample, S (ml) represents the used amount of the ethanol solution of KOH in the titration of the sample, and B (ml) represents the used amount of the ethanol solution of KOH in a blank titration.

$$\text{Acid value(mgKOH/g)} = [(S-B) \times f \times 5.61]/W$$

The binder resin preferably has a glass transition temperature (Tg) of 35 to 80° C., and more preferably 40 to 75° C., from the viewpoint of storage stability of toner. When Tg is too low, the toner may easily deteriorate in high-temperature atmosphere and may cause offset when fixed on a recording medium. When Tg is too high, the toner may have poor fixability.

The toner may include a magnetic material such as (1) magnetic iron oxides (e.g., magnetite, maghemite, ferrite) and iron oxides containing other metal oxides, (2) metals (e.g., iron, cobalt, nickel) and their alloys with aluminum, cobalt, copper, lead, magnesium, tin, zinc, antimony, beryllium, bismuth, cadmium, calcium, manganese, selenium, titanium, tungsten, and vanadium, and (3) mixtures of the above compounds.

Specific examples of usable magnetic materials include, but are not limited to, $Fe_3O_4$, $\gamma\text{-}Fe_2O_3$, $ZnFe_2O_4$, $Y_3Fe_5O_{12}$, $CdFe_2O_4$, $Gd_3Fe_5O_{12}$, $CuFe_2O_4$, $PbFe_{12}O$, $NiFe_2O_4$, $NdFe_2O$, $BaFe_{12}O_{19}$, $MgFe_2O_4$, $MnFe_2O_4$, $LaFeO_3$, iron powder, cobalt powder, and nickel powder. Two or more of these materials can be used in combination. Among these materials, fine powders of $Fe_3O_4$ and $\gamma\text{-}\gamma\text{-}Fe_2O_3$ are preferable.

Additionally, magnetic iron oxides (e.g., magnetite, maghemite, ferrite) including a heterogeneous element and mixtures thereof are also usable. The heterogeneous element may be, for example, lithium, beryllium, boron, magnesium, aluminum, silicon, phosphorus, germanium, zirconium, tin, sulfur, calcium, scandium, titanium, vanadium, chrome, manganese, cobalt, nickel, copper, zinc, or gallium. Among these heterogeneous elements, magnesium, aluminum, silicon, phosphorus, and zirconium are preferable. The heterogeneous elements may be incorporated into crystal lattice of iron oxides. Alternatively, oxides of the heterogeneous elements may be incorporated into iron oxides. Alternatively, oxides or hydroxides of the heterogeneous elements may exist on the surfaces of iron oxides. Preferably, oxides of the heterogeneous elements may be incorporated into iron oxides.

The heterogeneous element may be incorporated into an iron oxide by mixing a salt of the heterogeneous element with raw materials of the iron oxide while controlling pH. The heterogeneous element may be deposited on the surface of the iron oxide when controlling pH after the iron oxide particles are produced or at the time the salt of the heterogeneous element is mixed with the raw materials.

Preferably, the content of the magnetic material is 10 to 200 parts by weight, more preferably 20 to 150 parts by weight, based on 100 parts of the binder resin. The magnetic material preferably has a number average particle diameter of 0.1 to 2 μm, and more preferably 0.1 to 0.5 μm. The number average particle diameter may be determined by analyzing a transmission electron microscope image of the magnetic material with a digitizer.

The magnetic material preferably has an antimagnetic force of 20 to 150 oersted, a saturated magnetization of 50 to 200 emu/g, and a remanent magnetization of 2 to 20 emu/g, in a magnetic field of 10K oersted. The magnetic material may be used as a colorant.

Specific examples of usable colorants include, but are not limited to, carbon black, Nigrosine dyes, black iron oxide, NAPHTHOL YELLOW S, HANSA YELLOW (10G, 5G and G), Cadmium Yellow, yellow iron oxide, loess, chrome yellow, Titan Yellow, polyazo yellow, Oil Yellow, HANSA YELLOW (GR, A, RN and R), Pigment Yellow L, BENZIDINE YELLOW (G and GR), PERMANENT YELLOW (NCG), VULCAN FAST YELLOW (5G and R). Tartrazine Lake, Quinoline Yellow Lake, ANTHRAZANE YELLOW BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, PERMANENT RED (F2R, F4R, FRL, FRLL and F4RH), Fast Scarlet VD, VULCAN FAST RUBINE B, Brilliant Scarlet G, LITHOL RUBINE GX, Permanent Red FSR, Brilliant Carmine 6B, Pigment Scarlet 3B, Bordeaux 5B, Toluidine Maroon, PERMANENT BORDEAUX F2K, HELIO BORDEAUX BL, Bordeaux 10B, BON MAROON LIGHT, BON MAROON MEDIUM, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, and lithopone. Two or more of these colorants can be used in combination.

The content of the colorant in the toner is preferably 1 to 15% by weight, and more preferably 3 to 10% by weight.

The colorant can be combined with a resin to be used as a master batch. Specific examples of usable resin for the master batch include, but are not limited to, modified and unmodified polyester resins, polymers of styrene or styrene derivatives (e.g., polystyrene, poly-p-chlorostyrene, polyvinyl toluene), styrene-based copolymers (e.g., styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-vinyl methyl ketone copolymer, styrene-butadiene copolymer, styrene-isoprene copolymer, styrene-acrylonitrile-indene copolymer, styrene-maleic acid copolymer, styrene-maleate copolymer), polymethyl methacrylate, polybutyl methacrylate, polyvinyl chloride, polyvinyl acetate, polyethylene, polypropylene, epoxy resin, epoxy polyol resin, polyurethane, polyamide, polyvinyl butyral, polyacrylic acid resin, rosin, modified rosin, terpene resin, aliphatic or alicyclic hydrocarbon resin, aromatic petroleum resin, chlorinated paraffin, and paraffin wax. Two or more of these resins can be used in combination. Two or more of these resins can be used in combination.

The master batch can be obtained by mixing and kneading a resin and a colorant while applying a high shearing force. To increase the interaction between the colorant and the resin, an organic solvent can be used. More specifically, the maser batch can be obtained by a method called flushing in which an aqueous paste of the colorant is mixed and kneaded with the resin and the organic solvent so that the colorant is transferred to the resin side, followed by removal of the organic solvent and moisture. This method is advantageous in that the resulting wet cake of the colorant can be used as it is without being dried. When performing the mixing or kneading, a high shearing force dispersing device such as a three roll mill can be preferably used.

Preferably, the content of the master batch is 0.1 to 20 parts by weight based on 100 parts of the binder resin.

Preferably, the resin for the master batch has an acid value of 30 mgKOH/g or less and an amine value of 1 to 100. More preferably, the resin for the master batch has an acid value of 20 mgKOH/g or less and an amine value of 10 to 50. When the acid value is too large, chargeability and colorant dispersibility may be poor under high-humidity conditions. When the amine value is too small or large, colorant dispersibility may be poor. Acid value can be measured based on a method according to JIS K0070. Amine value can be measured based on a method according to JIS K7237.

Commercially available colorant dispersants such as AJISPER PB821 and PB822 (from Ajinomoto Fine-Techno Co., Inc.), DISPERBYK-2001 (from BYK-Chemie GmbH), and EFKA-4010 (from EFKA) are usable because they have high affinity for the binder resin.

The colorant dispersant preferably has a weight average molecular weight of 500 to 100,000, more preferably 3,000 to 100,000, much more preferably 5,000 to 50,000, and most preferably 5,000 to 30,000. The weight average molecular weight is determined from a styrene-conversion molecular weight at a maximum peak in a gel permeation chromatogram. When the molecular weight is too small, it means that the polarity of the dispersant is so high that colorants cannot be finely dispersed. When the molecular weight is too large, it means that an affinity of the dispersant for solvents is so high that colorants cannot be finely dispersed.

The content of the colorant dispersant is preferably 1 to 200 parts by weight, more preferably 5 to 80 parts by weight, based on 100 parts by weight of the colorant. When the content is too small, colorant dispersibility may be poor. When the content is too large, chargeability may be poor.

Specific examples of usable waxes include, but are not limited to, aliphatic hydrocarbon waxes (e.g., low-molecular-weight polyethylene, low-molecular-weight polypropylene, polyolefin wax, microcrystalline wax, paraffin wax, SASOL wax), aliphatic hydrocarbon wax oxides (e.g., oxidized polyethylene wax) and block copolymers thereof, plant waxes (e.g., candelilla wax, carnauba wax, sumac wax, jojoba wax), animal waxes (e.g., bees wax, lanolin, spermaceti), mineral waxes (e.g., ozokerite, ceresin, petrolatum), waxes mainly composed of fatty acid esters (e.g., montanate wax, castor wax), and partially or completely deoxidized fatty acid esters (e.g., deoxidized carnauba wax).

Specific examples of usable waxes further include, but are not limited to, saturated straight-chain fatty acids (e.g., palmitic acid, stearic acid, montanic acid, straight-chain alkylcarboxylic acids), unsaturated fatty acids (e.g., brassidic acid, eleostearic acid, parinaric acid), saturated alcohols (e.g., stearyl alcohol, eicosyl alcohol, behenyl alcohol, carnaubyl alcohol, ceryl alcohol, melissyl alcohol, long-chain alkyl alcohol), polyols (e.g., sorbitol), fatty acid amides (e.g., linoleic acid amide, olefin acid amide, lauric acid amide), saturated fatty acid bisamides (e.g., methylenebis capric acid amide, ethylenebis lauric acid amide, hexamethylenebis stearic acid amide), unsaturated fatty acid amides (e.g., ethylenebis oleic acid amide, hexamethylenebis oleic acid amide, N,N'-dioleyl adipic acid amide, N,N'-dioleyl sebacic acid amide), aromatic biamides (e.g., m-xylenebis stearic acid amide, N,N-distearyl isophthalic acid amide), metal salts of fatty acids (e.g., calcium stearate, calcium laurate, zinc stearate, magnesium stearate), aliphatic hydrocarbon waxes to which a vinyl monomer such as styrene and an acrylic acid is grafted, partial ester compounds of a fatty acid with a polyol (e.g., behenic acid monoglyceride), and methyl ester compounds having a hydroxyl group obtained by hydrogenating plant fats.

More preferably, specific examples of usable waxes include, but are not limited to, a polyolefin obtained by radical polymerizing an olefin under high pressure; a polyolefin obtained by purifying low-molecular-weight byproducts of a high-molecular-weight polyolefin; a polyolefin polymerized under low pressures in the presence of a Ziegler catalyst or a metallocene catalyst; a polyolefin polymerized using radiation, electromagnetic wave, or light; a low-molecular-weight polyolefin obtained by thermally decomposing a high-molecular-weight polyolefin; paraffin wax; microcrystalline wax; Fischer-Tropsch wax; synthetic hydrocarbon waxes synthesized by Synthol method, Hydrocaol method, or Arge method; synthetic waxes including a compound having one carbon atom as a monomer unit; hydrocarbon waxes having a functional group such as hydroxyl group and carboxyl group; mixtures of a hydrocarbon wax and a hydrocarbon wax having a functional group; and these waxes to which a vinyl monomer such as styrene, a maleate, an acrylate, a methacrylate, or a maleic anhydride is grafted.

These waxes may be preferably subjected to a press sweating method, a solvent method, a recrystallization method, a vacuum distillation method, a supercritical gas extraction method, or a solution crystallization method, so as to more narrow the molecular weight distribution thereof. Further, it is preferable that impurities such as low-molecular-weight solid fatty acids, low-molecular-weight solid alcohols, and low-molecular-weight solid compounds are removed from these waxes.

The wax preferably has a melting point of 70 to 140° C., more preferably 70 to 120° C., to give a good combination of fixability and offset resistance to the toner. When the melting point is too low, blocking resistance of the toner may be poor. When the melting point is too high, hot offset resistance of the toner may be poor.

When two kinds of waxes are used in combination, the wax mixture may simultaneously express plasticizing ability and releasing ability. A wax which expresses plasticizing ability may have a low melting point, a branched-chain molecular structure, or a polar group. A wax which expresses releasing ability may have a high melting point, a straight-chain molecular structure, or no functional group. It is preferable that the difference in melting point between the two waxes is 10 to 100° C. A combination of a polyolefin and a grafted polyolefin is preferable.

When the two kinds of waxes have a similar structure, one of the waxes having a lower melting point expresses plasticizing ability and the other having a higher melting point expresses releasing ability. When the difference in melting point between the two waxes is 10 to 100° C., the two waxes express their own function separately and effectively. When the difference is too small, it may be difficult for the two waxes to express their functions separately and effectively. When the difference is too large, it may be difficult for the two waxes to enhance each other's function. It is preferable that at least one of the waxes has a melting point of from 70 to 120° C., more preferably from 70 to 100° C. In this case, the two waxes can express their functions separately and effectively.

A wax having a relatively branched structure or a polar group, or being modified with a foreign material expresses plasticizing ability. A wax having a relatively straight structure or no functional group, or being unmodified expresses releasing ability. Specific preferred examples of suitable wax combinations include, but are not limited to, the followings: a combination of a polyethylene homopolymer or copolymer consists primarily of ethylene with a polyolefin homopolymer or copolymer consists primarily of an olefin other than ethylene; a combination of a polyolefin with a graft-modified polyolefin; a combination of an alcohol wax, a fatty acid wax, or an ester wax with a hydrocarbon wax; a combination of a Fischer-Tropsch wax or a polyolefin wax with a paraffin wax or a microcrystalline wax; a combination of a Fischer-Tropsch wax with a polyolefin wax; a combination of a paraffin wax with a microcrystalline wax; and a combination of a carnauba wax, a candelilla wax, a rice wax, or a montan wax with a hydrocarbon wax.

The toner preferably has a maximum endothermic peak within a temperature range of 70 to 110° C. in an endothermic curve measured by DSC. In this case, the toner has a good combination of storage stability and fixability.

Preferably, the content of the wax is 0.2 to 20 parts by weight, more preferably 0.5 to 10 parts by weight, based on 100 parts of the binder resin.

The melting point of a wax is defined as a temperature at which the maximum endothermic peak is observed in an endothermic curve of the wax measured by DSC.

Endothermic curves can be measured using a high-precision inner-heat power-compensation differential scanning calorimeter based on a method according to ASTM D3418-82. The endothermic curve is obtained by heating a sample at a heating rate of 10° C./min after preliminarily heating and cooling the sample.

The toner may include a fluidizer. The fluidizer is generally externally added to the surface of the toner to improve fluidity of the toner.

Specific preferred materials suitable for the fluidizer include, but are not limited to, carbon blacks; fine powders of fluorocarbon resins such as vinylidene fluoride and polytetrafluoroethylene; fine powders of silica prepared by a wet process or a dry process; fine powders of titanium oxide; fine powders of alumina; and fine powders of silica, titanium oxide, and alumina which are surface-treated with a silane-coupling agent, a titanium-coupling agent, or a silicone oil. Among these materials, fine powders of silica, titanium oxide, and alumina are preferable, and fine powders of silica which are surface-treated with a silane-coupling agent or a silicone oil are more preferable.

The fluidizer preferably has an average primary diameter of 0.001 to 2 μm, and more preferably 0.002 to 0.2 μm.

Fine powders of silica may be obtained from gas phase oxidation of silicon halides, and they are generally called as fumed silica.

Specific examples of commercially available fine powders of such silica obtained from gas phase oxidation of silicon halides include, but are not limited to, AEROSIL 130, 300, 380, TT600, MOX170, MOX80, and COK84 (from Nippon Aerosil Co., Ltd.); CAB-O-SIL M-5, MS-7, MS-75, HS-5, and EH-5 (from Cabot Corporation); WACKER HDK N20, V15, N20E, T30, and T40 (from Wacker Chemie AG); D-C Fine Silica (from Dow Corning Corporation); and Fransol (from Fransil).

More preferably, fine powders of silica obtained from gas phase oxidation of silicon halides are hydrophobized. In particular, the hydrophobized silica preferably has a hydrophobicity degree of 30 to 80% when measured by a methanol titration test. Hydrophobicity is given by chemically or physically treating silica with an organic silicon compound which is reactive with or adsorptive to the silica. Preferably, fine powders of silica obtained from gas phase oxidation of silicon halides are treated with an organic silicon compound.

Specific examples of the organic silicon compounds include, but are not limited to, hydroxypropyltrimethoxysilane, phenyltrimethoxysilane, n-hexadecyltrimethoxysilane, n-octadecyltrimethoxysilane, vinyltrimethoxysilane, vinyltriethoxysilane, vinyltriacetoxysilane, dimethylvinylchlorosilane, divinylchlorosilane, γ-methacryloxypropyltrimethoxysilane, hexamethyldisilazane, trimethylsilane, trimethylchlorosilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triorganosilyl mercaptan, trimethylsilyl mercaptan, triorganosilyl acrylate, vinyldimethylacetoxysilane, dimethylethoxysilane, trimethylethoxysilane, trimethylmethoxysilane, methyltriethoxysilane, isobutyltrimethoxysilane, dimethyldimethoxysilane, diphenyldiethoxysilane, hexamethyldisiloxane, 1,3-divinyltetramethyldisiloxane, 1,3-diphenyltetramethyldisiloxane, and dimethylpolysiloxane having 2 to 12 siloxane units and 0 to 1 terminal silanol group. Other than the above compounds, silicone oils such as dimethyl silicone oil are also preferable. Two or more of these compounds can be used alone or in combination.

The fluidizer preferably has a number average particle diameter of 5 to 100 nm, and more preferably 5 to 50 nm.

The fluidizer preferably has a specific surface area of 30 $m^2/g$ or more, and more preferably 60 to 400 $m^2/g$, when measured by nitrogen adsorption in the BET method. The surface-treated fluidizer preferably has a specific surface area of 20 $m^2/g$ or more, and more preferably 40 to 300 $m^2/g$, when measured by nitrogen adsorption in the BET method.

Preferably, the content of the fluidizer is 0.03 to 8 parts by weight based on 100 parts of the toner particles.

The toner may further include other additives, such as metal soaps, fluorine-based surfactants, dioctyl phthalate, conductivity imparting agents (e.g., tin oxide, zinc oxide, carbon black, antimony oxide), and fine powders of inorganic materials (e.g., titanium oxide, aluminum oxide, alumina), for the purpose of protecting electrostatic latent image bearing members and carriers, improving cleanability and fixability, controlling thermal, electric, and physical properties, and controlling electric resistance and melting point. The fine powders of inorganic materials may be optionally hydrophobized. The toner may further include other additives, such as lubricants (e.g., polytetrafluoroethylene, zinc stearate, polyvinylidene fluoride), abrasives (e.g., cesium oxide, silicon carbide, strontium titanate), anti-caking agents, and developability improving agents such as white or black particles having the opposite polarity to the toner particles.

For the purpose of controlling charge amount, the above-described additives may be treated with a silicone varnish, a modified silicone varnish, a silicone oil, a modified silicone oil, a silane-coupling agent, a silane-coupling agent having a functional group, or an organic silicon compound.

When preparing a developer, fine powders of inorganic materials such as hydrophobized silica (hereinafter "external additives") may be mixed with the toner to improve fluidity, storage stability, developability, and transferability of the developer. It is preferable that the toner is mixed with such external additives by a mixer equipped with a jacket so that the inner temperature is variable. Load history given to the external additive may be varied when the external additive is gradually added or added from the middle of the mixing. Alternatively, it can be varied by varying the revolution, rotating speed, time, and temperature in the mixing. The load may be initially strong and may gradually weaken, or vice versa. Specific examples of usable mixers include, but are not limited to, a V-type mixer, a Rocking mixer, a Loedige mixer, a Nauta mixer, and a Henschel mixer.

Particulate inorganic materials are preferably used as the external additive. Specific preferred examples of suitable particulate inorganic materials include, but are not limited to, silica, alumina, titanium oxide, barium titanate, magnesium titanate, calcium titanate, strontium titanate, zinc oxide, tin oxide, quartz sand, clay, mica, sand-lime, diatom earth, chromium oxide, cerium oxide, red iron oxide, antimony trioxide, magnesium oxide, zirconium oxide, barium sulfate, barium carbonate, calcium carbonate, silicon carbide, and silicon nitride. The particulate inorganic material preferably has a primary particle diameter of 5 mμ to 2 μm, and more preferably 5 mμ to 500 mμ.

The particulate inorganic material preferably has a BET specific surface of 20 to 500 $m^2/g$. The content of the particulate inorganic material is preferably 0.01 to 5% by weight, and more preferably 0.01 to 2.0% by weight, based on the toner.

Additionally, particles of polymers prepared by soap-free emulsion polymerization, suspension polymerization, or dispersion polymerization (e.g., polystyrene, copolymers of methacrylates or acrylates), polycondensation polymers (e.g., silicone, benzoguanamine, nylon), and thermosetting resins are also usable as the external additive.

The surface of the external additive may be hydrophobized so as-to-prevent deterioration even under high-humidity conditions. Specific preferred examples of suitable surface treatment agents include, but are not limited to, silane coupling agents, silylation agents, silane coupling agents having a fluorinated alkyl group, organic titanate coupling agents, aluminum coupling agents, silicone oils, and modified silicone oils.

The toner may further include a cleanability improving agent so as to be easily removable from a photoreceptor or a primary transfer medium when remaining thereon after image transfer. Specific preferred examples of suitable cleanability improving agents include, but are not limited to, metal salts of fatty acids (e.g., zinc stearate, calcium stearate) and fine particles of polymers prepared by soap-free emulsion polymerization (e.g., polymethyl methacrylate, polystyrene).

Such fine particles of polymers preferably have a narrow size distribution and a volume average particle diameter of 0.01 to 1 μm.

The toner may be used for electrophotography using typical electrostatic latent image bearing members such as organic electrostatic latent image bearing members, amorphous silica electrostatic latent image bearing members, selenium electrostatic latent image bearing members, and zinc oxide electrostatic latent image bearing members.

The method of manufacturing toner according to exemplary aspects of the invention is described below with reference to FIGS. 4A and 4B. As illustrated, the toner constituents liquid 14 is discharged from the multiple nozzles 19 provided to the liquid column resonance liquid chamber 18 in the liquid droplet discharge head 11 in the liquid droplet forming unit 10 and is formed into liquid droplets. The liquid droplets are solidified into toner particles. The ratio p/d of the interval p to the outlet diameter d of the nozzles 19 is between 2.5 and 7.5. When p/d is within the above-described range, multiple accompanying air currents generated around multiple lines of liquid droplets discharged from the multiple nozzles 19 are overlapped with each other and formed into a single accompanying air current. Therefore, the liquid droplets other than those existing in the outermost lines are not influenced by each accompanying air current. The moving speed of the liquid droplets is reduced only by the action of viscosity of the gas phase. It is likely that the distance between the liquid droplets are not so shortened. Thus, the occurrence of vertical coalescence of liquid droplets can be prevented and the resulting toner can provide thin line reproducibility.

As described above, the nozzles 19 that discharge the toner constituents liquid 14 are provided to the liquid column resonance liquid chamber 18. Within the liquid column resonance liquid chamber 18, the vibration generator 20 is also provided. When the vibration generator 20 vibrates at a proper frequency, liquid column resonance occurs within the liquid column resonance liquid chamber 18 and causes a pressure standing wave. The pressure standing wave has antinodes at which the pressure amplitude becomes maximum. When the nozzles 19 are provided to the area corresponding to the antinode, the toner constituents liquid can be continuously discharged from the nozzles 19. The discharged liquid droplets are solidified into toner particles. Thus, multiple nozzles 19 are provided to at least one area corresponding to the antinode of the pressure standing wave so that the toner constituents liquid is continuously discharged from the nozzles 19 with a high manufacturability. Additionally, it is preferable that each liquid column resonance liquid chamber 18 includes multiple nozzles 19 to improve manufacturability.

The vibration generator 20 may vibrate at a main frequency f calculated from the formula $f=N \times c/(4L)$, so as to cause liquid column resonance within the liquid column resonance liquid chamber 18 and continuously and stably discharge the toner constituents liquid. In this formula, L represents a longitudinal length of the liquid column resonance liquid chamber 18, c represents the sonic speed of the toner constituents liquid, and N represents an integer.

Also, the vibration generator 20 may vibrate at a main frequency f calculated from the formula $N \times c/(4L) \leq f \leq N \times c/(4Le)$, so as to cause liquid column resonance within the liquid column resonance liquid chamber 18 and continuously discharge the toner constituents liquid. In this formula, L represents a longitudinal length of the liquid column resonance liquid chamber 18, Le represents a distance between a longitudinal end on which the liquid common supply path 17 is provided and the nozzle closest to the longitudinal end, c represents the sonic speed of the toner constituents liquid, and n represents an integer. Preferably, $Le/L > 0.6$ is satisfied.

Also, the vibration generator 20 may vibrate at a main frequency f calculated from the formula $N \times c/(4L) \leq f \leq (N+1) \times c/(4Le)$, so as to cause liquid column resonance within the liquid column resonance liquid chamber 18 and continuously discharge the toner constituents liquid. In this formula, l represents a longitudinal length of the liquid column resonance liquid chamber 18, Le represents a distance between a longitudinal end on which the liquid common supply path 17 is provided and the nozzle closest to the longitudinal end, c represents the sonic speed of the toner constituents liquid, and n represents an integer.

When liquid droplets are discharged only by the action of the liquid droplet forming unit, the discharged liquid droplets are undesirably decelerated by viscosity resistance of the air, causing coalescence of liquid droplets in continuous discharging. To solve this problem, the airflow pathway 12 is provided adjacent to the nozzles 19. An airflow which passes through the airflow pathway 12 accelerates the discharged liquid droplets to prevent coalescence of a preceding liquid droplets and a subsequent liquid droplet, resulting in production of uniformly-sized toner particles.

To make the moving speed of the liquid droplets controllable, it is preferable that the initial discharge velocity of the liquid droplets is smaller than the speed of the airflow. When the moving speed of the liquid droplets is controllable, the liquid droplets can be continuously and stably discharged without causing coalescence. The toner constituents liquid includes an organic solvent. The organic solvent is finally removed from the liquid droplets so that the liquid droplets are solidified into toner particles. Because of including an organic solvent, it is unlikely that the toner constituents liquid fixedly adhere to the liquid droplet discharge head, improving manufacturing efficiency.

As described above, the toner manufacturing apparatus according to exemplary embodiments of the invention includes the liquid droplet forming unit 10 and the drying collecting unit 30. The liquid droplet forming unit 10 discharges the toner constituent liquid 14 from the nozzles 19 provided on a part of a wall surface which connects both longitudinal ends of the liquid column resonance liquid chamber 18, as illustrated in FIG. 2. The liquid common supply path 17 is provided on one longitudinal end wall surface of the liquid column resonance liquid chamber 18. Within the liquid column resonance liquid chamber 18, the vibration generator 20 is also provided. When the vibration generator 20 applies a high-frequency vibration to the toner constituents liquid in the liquid column resonance liquid chamber 18, liquid column resonance occurs and a standing wave, as illustrated in FIGS. 6A to 6D and FIGS. 7A to 7C, is formed between both longitudinal end wall surfaces of the liquid column resonance liquid chamber 18. The vibration frequency is preferably 300 kHz or more. The standing wave causes a pressure distribution within the liquid column resonance liquid chamber 18. Continuous discharge of liquid droplets and continuous supply of the toner constituents liquid are provided by the pressure distribution. The discharged liquid droplets are solidified into toner particles in the drying collecting unit 30. The toner manufacturing apparatus according to exemplary embodiments can continuously discharges the toner constituents liquid from the nozzles 19 with a high manufacturability.

Additional modifications and variations of the present invention are possible in light of the above teachings. It is therefore to be understood that within the scope of the appended claims the invention may be practiced other than as specifically described herein.

What is claimed is:

1. A method of manufacturing toner, comprising:
    discharging a toner constituents liquid from multiple nozzles to form liquid droplets; and
    solidifying the liquid droplets into toner particles,
    the multiple nozzles satisfying the following formula:

$$2.5 \leq p/d \leq 7.5$$

wherein d represents an outlet diameter of each nozzle and p represents an interval between two nozzles,
    the discharging further comprising:
    vibrating the toner constituents liquid in a liquid column resonance liquid chamber having the multiple nozzles so that a standing wave is formed by liquid column resonance and,
    the multiple nozzles being formed in a region including an antinode of the standing wave.

2. The method according to claim 1, the outlet diameter d being 4 to 15 μm.

3. The method according to claim 1, the toner constituents comprising a resin.

4. The method according to claim 1, at least one longitudinal end of the liquid column resonance liquid chamber having a reflective wall surface.

5. The method according to claim 1, the toner constituents liquid being vibrated at a frequency f represented by the following formula:

$$f = N \times c/(4L)$$

wherein L represents a longitudinal length of the liquid column resonance liquid chamber, c represents a sonic speed in the toner constituents liquid, and N represents an integer.

6. The method according to claim 1, the toner constituents liquid being vibrated at a frequency f represented by the following formula:

$$N \times c/(4L) \leq f \leq N \times c/(4Le)$$

wherein L represents a longitudinal length of the liquid column resonance liquid chamber, Le represents a distance between a longitudinal end of the liquid column resonance liquid chamber on which a liquid common supply path is provided and a nozzle closest to said longitudinal end, c represents a sonic speed in the toner constituents liquid, and N represents an integer.

7. The method according to claim 6, the method further satisfying the following formula:

$$Le/L > 0.6.$$

8. The method according to claim 1, the toner constituents liquid being vibrated at a frequency f represented by the following formula:

$$N \times c/(4L) \leq f \leq (N+1) \times c/(4Le)$$

wherein L represents a longitudinal length of the liquid column resonance liquid chamber, Le represents a distance between a longitudinal end of the liquid column resonance liquid chamber on which a liquid common supply path is provided and a nozzle closest to said longitudinal end, c represents a sonic speed in the toner constituents liquid, and N represents an integer.

9. The method according to claim 1, the toner constituents liquid being vibrated at a frequency of 300 kHz or more.

10. The method according to claim 1, further comprising:
    conveying the discharged liquid droplets by an airflow to an area where the liquid droplets are to be solidified.

11. The method according to claim 10, an initial discharge velocity of the liquid droplets being smaller than a speed of the airflow.

12. The method according to claim 1, the toner constituents liquid including an organic solvent, and the solidifying further comprising removing the organic solvent from the liquid droplets.

13. A method of manufacturing resin particles, comprising:
    discharging a liquid including a resin from multiple nozzles to form liquid droplets; and
    solidifying the liquid droplets into resin particles,
    the multiple nozzles satisfying the following formula:

$$2.5 \leq p/d \leq 7.5$$

wherein d represents an outlet diameter of each nozzle and p represents an interval between two nozzles,
    the discharging further comprising:
    vibrating the liquid in a liquid column resonance liquid chamber having the multiple nozzles so that a standing wave is formed by liquid column resonance and,
    the multiple nozzles being formed in a region including an antinode of the standing wave.

14. The method according to claim 13, the outlet diameter d being 4 to 15 μm.

15. The method according to claim 13, at least one longitudinal end of the liquid column resonance liquid chamber having a reflective wall surface.

16. The method according to claim 13, the liquid being vibrated at a frequency f represented by the following formula:

$$f = N \times c/(4L)$$

wherein L represents a longitudinal length of the liquid column resonance liquid chamber, c represents a sonic speed in the liquid, and N represents an integer.

* * * * *